US012463324B2

(12) United States Patent
Cai et al.

(10) Patent No.: US 12,463,324 B2
(45) Date of Patent: Nov. 4, 2025

(54) ELECTRONIC DEVICE

(71) Applicant: HUAWEI TECHNOLOGIES CO., LTD., Shenzhen (CN)

(72) Inventors: Xiaotao Cai, Shenzhen (CN); Dawei Zhou, Shenzhen (CN); Wei Xiong, Shenzhen (CN); Yuanpeng Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 212 days.

(21) Appl. No.: 18/258,158

(22) PCT Filed: Dec. 17, 2021

(86) PCT No.: PCT/CN2021/139063
§ 371 (c)(1),
(2) Date: Jun. 16, 2023

(87) PCT Pub. No.: WO2022/127896
PCT Pub. Date: Jun. 23, 2022

(65) Prior Publication Data

US 2024/0055762 A1 Feb. 15, 2024

(30) Foreign Application Priority Data

Dec. 18, 2020 (CN) ......................... 202011507812.7

(51) Int. Cl.
*H01Q 1/24* (2006.01)
*H01Q 5/328* (2015.01)
*H01Q 5/378* (2015.01)

(52) U.S. Cl.
CPC ............. *H01Q 1/243* (2013.01); *H01Q 5/328* (2015.01); *H01Q 5/378* (2015.01)

(58) Field of Classification Search
CPC ............ H01Q 1/22; H01Q 1/243; H01Q 5/10; H01Q 5/20; H01Q 5/328; H01Q 5/378; H01Q 7/00; H01Q 9/42; H01Q 21/28
See application file for complete search history.

(56) References Cited

U.S. PATENT DOCUMENTS 10,236,558 B2 3/2019 Mai
10,879,589 B2 * 12/2020 Lim .................... H04M 1/0268
2016/0064820 A1 * 3/2016 Kim ....................... H01Q 1/243
343/767

FOREIGN PATENT DOCUMENTS

CN 107871931 A 4/2018
CN 108511905 A 9/2018
(Continued)

*Primary Examiner* — Daniel Munoz
(74) *Attorney, Agent, or Firm* — Leydig, Voit & Mayer, Ltd.

(57) ABSTRACT

An electronic device includes a reference ground layer, a first radiator, and a second radiator, where the reference ground layer has a first edge, and a second edge and a third edge respectively connected to two ends of the first edge. The first radiator has a first ground point and a first feed point that are disposed at an interval. The second radiator is electrically connected to the first edge of the reference ground layer, or an end section that is of the second edge and that is connected to the first edge, or an end section that is of the third edge and that is connected to the first edge. When a radio frequency signal is fed at the first feed point, a parasitic resonant band generated by the second radiator is lower than the main resonant band generated by the first radiator.

18 Claims, 24 Drawing Sheets

(56) References Cited

FOREIGN PATENT DOCUMENTS

| | | | |
|---|---|---|---|
| CN | 108631041 | A | 10/2018 |
| CN | 113140896 | A | 7/2021 |
| WO | 2020010923 | A1 | 1/2020 |
| WO | 2020173294 | A1 | 9/2020 |
| WO | 2020228728 | A1 | 11/2020 |

* cited by examiner

ELECTRONIC DEVICE

CROSS-REFERENCE TO RELATED APPLICATIONS

This application is a National Stage of International Application No. PCT/CN2021/139063, filed on Dec. 17, 2021, which claims priority to Chinese Patent Application No. 202011507812.7, filed on Dec. 18, 2020, both of which are hereby incorporated by reference in their entireties.

TECHNICAL FIELD

This application relates to the field of electronic device technologies, and in particular, to an electronic device.

BACKGROUND

Currently, a design solution of an antenna of an electronic device is usually as follows: a metal radiator disposed on an inner surface of a metal frame or a non-metal frame, or a metal radiator embedded inside a non-metal material is used to implement a communication function. However, with popularity of a large screen such as a curved screen, a size of a frame of the electronic device becomes smaller in a thickness direction of the electronic device. In this case, when the curved screen becomes more extreme, a clearance environment of the antenna of the electronic device deteriorates, and a radiation capability becomes worse. Consequently, radiation efficiency of the antenna is low.

SUMMARY

Embodiments of this application provide an electronic device, to improve radiation efficiency of an antenna in the electronic device.

To achieve the foregoing objective, some embodiments of this application provide an electronic device. The electronic device includes a reference ground layer, a first radiator, and a second radiator. The reference ground layer has a first edge, and a second edge and a third edge that are respectively connected to two ends of the first edge. The first radiator has a first ground point and a first feed point that are disposed at an interval, the first ground point is electrically connected to the reference ground layer, and the first feed point is configured to feed the first radiator. The second radiator and the first radiator are disposed at an interval, and the second radiator is electrically connected to the first edge of the reference ground layer, or an end section that is of the second edge and that is connected to the first edge, or an end section that is of the third edge and that is connected to the first edge. The reference ground layer can be excited within a main resonant band of the first radiator to generate a ½ wavelength characteristic mode in a first direction, in other words, an electrical length of the reference ground layer in the first direction is a ½ wavelength of the main resonant band of the first radiator. The first direction is parallel to a plane on which the reference ground layer is located and perpendicular to an extension direction of the first edge of the reference ground layer. A parasitic resonant band generated by the second radiator when a radio frequency signal is fed at the first feed point is lower than a main resonant band generated by the first radiator when the radio frequency signal is fed at the first feed point.

In the technical solution, the second radiator is added, so that the parasitic resonant band generated through coupling between the second radiator and the first radiator when the radio frequency signal is fed at the first feed point is lower than the main resonant band of the first radiator. Further, the second radiator is electrically connected to the first edge of the reference ground layer, so that the reference ground layer can be excited within the main resonant band of the first radiator to generate the ½ wavelength characteristic mode in the first direction, in other words, the electrical length of the reference ground layer in the first direction is the ½ wavelength of the main resonant band of the first radiator. In this way, the first radiator is excited to generate resonance, and the second radiator excites the reference ground layer, to improve radiation efficiency of an antenna.

In a possible implementation, the parasitic resonant band generated by the second radiator when the radio frequency signal is fed at the first feed point is close to the main resonant band generated by the first radiator when the radio frequency signal is fed at the first feed point.

In a possible implementation, the second radiator is electrically connected to an end section of the first edge of the reference ground layer, where the end section of the first edge is a section in which a distance to a first end or a second end of the first edge falls within a fourth preset length range. In some embodiments, the fourth preset length may be ½ times a length of the second edge. In this way, when the second radiator excites the reference ground layer, a first direction mode is well excited, so that radiation efficiency of the antenna can be further improved.

In a possible implementation, the second radiator is electrically connected to the first edge of the reference ground layer, the end section that is of the second edge and that is connected to the first edge, or the end section that is of the third edge and that is connected to the first edge through a lumped parameter element. In this way, an electrical length of the second radiator is adjusted through the lumped parameter element, to reduce a physical length of the second radiator while adjusting the parasitic resonant band generated by the second radiator when the radio frequency signal is fed at the first feed point to be lower than the main resonant band of the first radiator. Therefore, an occupation length of the antenna on a frame can be reduced.

In a possible implementation, the lumped parameter element is an inductor, a capacitor, or a circuit obtained by connecting one or two of an inductor or a capacitor in parallel, in series, or in series-parallel.

In a possible implementation, the second radiator has a second feed point and a second ground point that are disposed at an interval, the second feed point is configured to feed the second radiator, the second ground point is electrically connected to the reference ground layer through a filter or a switch circuit, and the filter and the switch circuit are configured to prevent a signal within a first band from passing through and allow a signal within a second band to pass through. The first band includes a minimum frequency value within the parasitic resonant band generated by the second radiator when the radio frequency signal is fed at the first feed point to a maximum frequency value within the main resonant band generated by the first radiator when the radio frequency signal is fed at the first feed point, and the second band includes a main resonant band generated the second radiator when a radio frequency signal is fed at the second feed point. In this way, the antenna provided in this embodiment can transmit or receive the signal within the first band when the radio frequency signal is fed at the first feed point, and can further transmit or receive the signal within the second band when the radio frequency signal is fed at the second feed point. Therefore, the antenna has more application bands and a wide application range.

In a possible implementation, the filter is an LC filter.

In a possible implementation, the switch circuit includes a first switching switch and a plurality of different first tuning elements, and the plurality of first tuning elements are electrically connected to the reference ground layer. The first switching switch is configured to: when the radio frequency signal within the first band is fed at the first feed point, disconnect an electrical connection path between the second ground point and the plurality of first tuning elements; or when the radio frequency signal within the second band is fed at the second feed point, electrically connect the different first tuning elements to the second ground point in a switchable manner, to adjust the resonant band generated by the second radiator. In this way, the switch circuit can prevent the signal within the first band from passing through and allow the signal within the second band to pass through. The switch circuit may further adjust an operating band of the second radiator.

In a possible implementation, the electronic device is a mobile phone. A length of a middle plate in a longitudinal direction is 150 mm±10 mm, and a width of the middle plate in a transverse direction is 75 mm±5 mm. The first direction is consistent with the longitudinal direction of the middle plate, and a shorter edge of the middle plate forms the first edge of the reference ground layer. The first band falls within a low band, and the second band falls within a medium/high band. In this way, the antenna provided in this embodiment of this application can cover a low/middle/high band (LMH), and has a wide application range.

In a possible implementation, the electronic device is a mobile phone. A length of a middle plate in a longitudinal direction is 150 mm±10 mm, and a width of the middle plate in a transverse direction is 75 mm±5 mm. The first direction is consistent with the transverse direction of the middle plate, and a longer edge of the middle plate forms the first edge of the reference ground layer. The first band falls within an MHB band, and the second band falls within an LB band.

In a possible implementation, the electronic device further includes a conductive middle plate and a conductive frame. The middle plate has a first edge, and a second edge and a third edge that are respectively connected to two ends of the first edge. The middle plate forms the reference ground layer, the first edge of the middle plate forms the first edge of the reference ground layer, the second edge of the middle plate forms a second edge of the reference ground layer, and the third edge of the middle plate forms the third edge of the reference ground layer. The frame is disposed around the edges of the middle plate, the frame includes a first side, and the first side is disposed around the first edge of the middle plate. The frame has at least a first gap, a second gap, and a third gap, the first gap and the second gap are located on the first side, and a part that is of the frame and that is located on one side of the first gap and adjacent to the first gap forms the first radiator. The third gap and the first radiator are respectively located on two sides of the first gap, the second gap and the first gap are a same gap, or the second gap is located between the third gap and the first gap, and a part that is of the frame and that is located between the second gap and the third gap forms the second radiator. There are clearances between the first radiator and the middle plate, and between the second radiator and the middle plate. In this way, a frame antenna is formed, and radiation efficiency of the frame antenna can be improved.

In a possible implementation, the second gap is located between the third gap and the first gap, a part that is of the frame and that is located between the first gap and the second gap forms a floating conductor. The electronic device further includes a USB device, and the USB device is located on an inner side of the floating conductor and is attached to the floating conductor. Because the USB device is usually disposed close to a bottom edge of an electronic device such as a mobile phone or a tablet computer, an antenna located at the bottom edge of the electronic device can be constructed, and radiation efficiency of the antenna located at the bottom edge of the electronic device can be improved.

In a possible implementation, the first gap and the second gap are symmetrically disposed with respect to a center point of the first side. In this way, aesthetics of the electronic device can be improved.

In a possible implementation, the first gap, the second gap, and the third gap are filled with a dielectric material, to ensure structural integrity of the frame.

In a possible implementation, the clearances are filled with a dielectric material, to ensure structural integrity of the middle frame.

In a possible implementation, the first edge of the middle plate has a first end. A distance between the first end of the first edge and the first gap in an extension direction of the first side is greater than a distance between the first end of the first edge and the second gap in the extension direction of the first side, and the second radiator is electrically connected to an end section in which the first end of the first edge of the middle plate is located. The end section in which the first end of the first edge is located is a section in which a distance to the first end of the first edge falls within a fourth preset length range. Because a distance between the end section in which the first end of the first edge is located and the second radiator is short, an electrical connection path between the second radiator and the end section in which the first end is located is short. This facilitates wiring.

In a possible implementation, the first end of the first edge is connected to the second edge of the middle plate. The frame further has a second side, the second side is disposed around the second edge of the middle plate, and the third gap is disposed on the second side.

In a possible implementation, the second radiator includes a first section and a second section that intersect. The first section is located between the second gap and the second section, the second section is located between the first section and the third gap, and a length of the second section is less than or equal to ¼ times a length of the second side.

In a possible implementation, the first edge of the middle plate further has a second end opposite to the first end, and the second end of the first edge is connected to the third edge of the middle plate. The frame further has a third side, and the third side is disposed around the third edge of the middle plate. The frame further has a fourth gap, the fourth gap is disposed on the third side, and a part that is of the frame and that is between the first gap and the fourth gap forms the first radiator.

In a possible implementation, the first radiator includes a third section and a fourth section that intersect. The third section is located between the first gap and the fourth section, the fourth section is located between the third section and the fourth gap, and a length of the fourth section is less than or equal to ½ times a length of the third side.

In a possible implementation, a part that is of the frame and that is adjacent to the third gap forms a third radiator, the third radiator and the second radiator are respectively located on two sides of the third gap, and there is a clearance between the third radiator and the middle plate. The third radiator has a third ground point and a third feed point that are disposed at an interval, the third ground point is electrically connected to the reference ground layer, and the third feed point is configured to feed the third radiator. In this way, the third radiator can generate resonance when a radio frequency signal is fed at the third feed point, to further increase a quantity of radiation bands of the antenna.

In a possible implementation, the third radiator further has a connection point, and the electronic device further includes a switching circuit. The switching circuit includes a second switching switch and a plurality of different second tuning elements, and the plurality of second tuning elements are electrically connected to the reference ground layer. The second switching switch is configured to electrically connect the different second tuning elements to the connection point in a switchable manner, to adjust a resonant frequency of the third radiator. In this way, the resonant frequency of the third radiator is tuned through the switching circuit, to further increase a band covered by the antenna.

In a possible implementation, the first switching switch in the switch circuit and the second switching switch in the switching circuit are packaged together, and an entire switch line of a switch formed through package is a superposition of a switch line of the first switching switch and a switch line of the second switching switch. Therefore, a quantity of components included in the electronic device can be reduced, and an assembly process of the electronic device can be simplified.

REFERENCE NUMERALS

1—Electronic device; 11—Display; 12—Middle frame; 121—Middle plate; 122—Frame; 122*a*—First side; 122*b*—Second side; 122*c*—Third side; 122*d*—Fourth side; 13—Back cover; 14—Antenna; 15—First radio frequency front end; 23—Reference ground layer; 141—First radiator; 1411—First section; 1412—Second section; 16—Clearance; 142*a*—First feed point; 141*b*—First ground point; 142—Second radiator; 143—Floating conductor; 18—USB device; 17—Lumped parameter element; 142*b*—Second ground point; 142*a*—Second feed point; 19—Filter; 21—Switch circuit; 211—First switching switch; 212—First tuning element; 20—Second radio frequency front end; 144—Third radiator; 144*b*—Third ground point; 144*a*—Third feed point; 144*c*—Connection point; 22—Third radio frequency front end; 24—Switching circuit; 241—Second switching switch; and 242—Second tuning element.

DESCRIPTION OF EMBODIMENTS

In embodiments of this application, the terms "first", "second", and "third" are used only for describing purposes, and cannot be understood as an indication or implication of relative importance or an implication of a quantity of indicated technical features. Therefore, the features defined with "first", "second", and "third" may explicitly or implicitly include one or more of the features.

It should be noted that, in embodiments of this application, the term "including", "include", or any other variants are intended to cover a non-exclusive inclusion, so that a process, a method, an article or an apparatus that includes a list of elements not only includes those elements but also includes other elements which are not expressly listed, or further includes elements inherent to such a process, method, article or apparatus. Without further limitation, the element defined by the sentence "including a . . . " does not exclude that other identical elements are also present in the process, method, article or apparatus including the element.

This application provides an electronic device. The electronic device may be a portable electronic apparatus or another appropriate electronic apparatus. For example, the electronic device may be a notebook computer, a tablet computer, or a smaller device such as a mobile phone, a watch, or a pendant device, another wearable or micro device, a cellular phone, or a media player.

Figure 1:
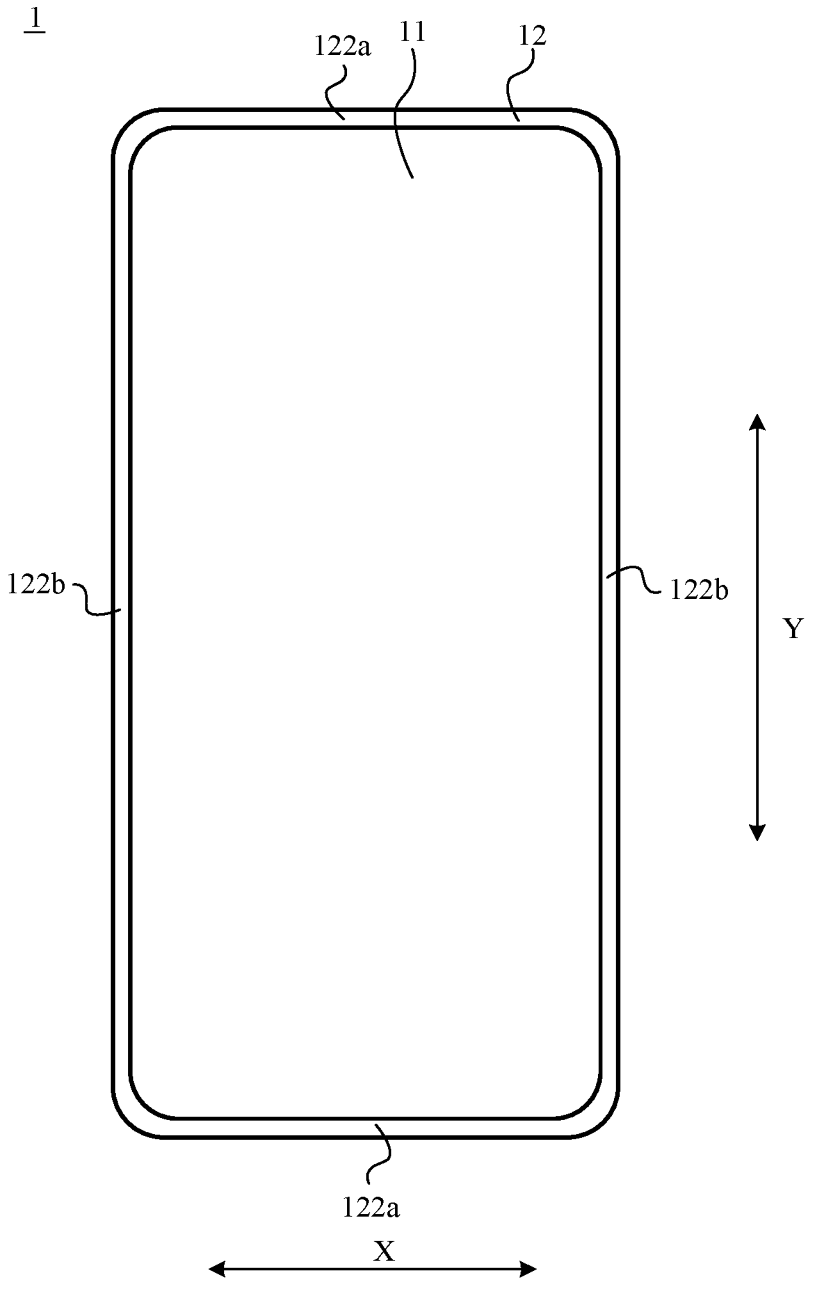
FIG. 1 is a main view of an electronic device according to some embodiments of this application.
Figure 2:
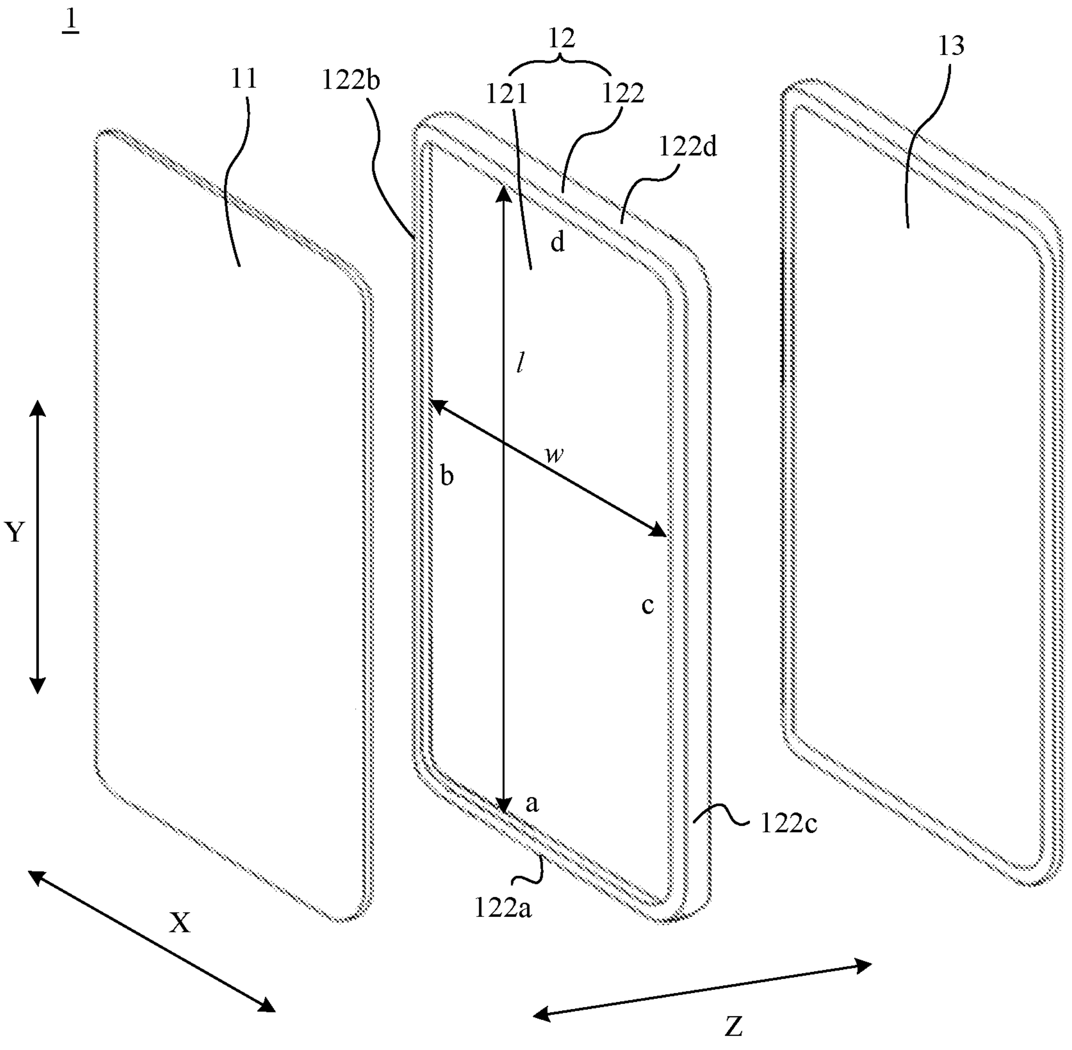
FIG. 2 is an exploded view of the electronic device shown in FIG. 1.

FIG. 1 is a main view of an electronic device 1 according to some embodiments of this application. FIG. 2 is an exploded view of the electronic device 1 shown in FIG. 1. In this embodiment, the electronic device 1 is a mobile phone. The electronic device 1 includes a display 11, a middle frame 12, and a back cover 13.

The display 11 is configured to display an image, a video, and the like. The display 11 may be a flexible display, or may be a rigid display. For example, the display 11 may be an organic light-emitting diode (OLED) display, an active-matrix organic light-emitting diode (AMOLED) display, a mini light-emitting diode display, a micro light-emitting diode display, a micro organic light-emitting diode display, a quantum dot light emitting diode (QLED) display, or a liquid crystal display (LCD).

The back cover 13 forms a rear housing of the electronic device 1. The back cover 13 is configured to provide waterproof and dustproof protection for electronic components in the electronic device 1, and ensure appearance neatness of the electronic device 1. A forming material of the back cover 13 may be a conductive material such as metal, or may be a non-conductive material such as glass or plastic. When the forming material of the back cover 13 is a conductive material such as metal, the back cover 13 may be used as a reference ground for an electronic component or a radio frequency component in the electronic device.

The middle frame 12 includes a middle plate 121 and a frame 122. The middle plate 121 is located between the display 11 and the back cover 13, and is stacked with the display 11 and the back cover 13 in a thickness direction (a Z direction shown in the figure) of the electronic device 1. A forming material of the middle plate 121 is a conductive material such as metal. The middle plate 121 is an approximately rectangular plate-shaped structure. The middle plate 121 has a first edge a and a fourth edge d that are opposite to each other, and a second edge b and a third edge c that are opposite to each other. The first edge a and fourth edge d are two shorter edges of the middle plate 121, and the second edge b and the third edge c are two longer edges of the middle plate 121. It should be noted that the first edge a and the fourth edge d may alternatively be two longer edges of the middle plate 121, and in this case, the second edge b and the third edge c are two shorter edges of the middle plate 121. A length l of the middle plate 121 in an extension direction of the two longer edges is 150 mm±10 mm, and a width w of the middle plate 121 in an extension direction of the two shorter edges is 75 mm±5 mm. For ease of the following description, the extension direction of the two shorter edges of the middle plate 121 is defined as a transverse direction (an X direction shown in the figure), and the extension direction of the two longer edges of the middle plate 121 is defined as a longitudinal direction (a Y direction shown in the figure).

The frame 122 is disposed around the edges of the middle plate 121. The frame 122 includes a first side **122*a*, a second side 122*b*, a third side 122*c*, and a fourth side 122*d*. The first side 122*a* is disposed around the first edge a, the second side 122*b* is disposed around the second edge b, the third side 122*c* is disposed around the third edge c, and the fourth side 122*d* is disposed around the fourth edge d. The first side 122*a*, the second side 122*b*, the third side 122*c*, and the fourth side 122*d* are connected end to end to form the frame 122 with a square shape. In this embodiment, the electronic device 1 is a square plate-shaped structure, in other words, the frame 122 is square. A forming material of the frame 122** may be a conductive material such as metal, or may be a non-conductive material such as plastic or resin.

FIG. **3*a* is a schematic diagram of an internal structure of the electronic device 1 shown in FIG. 1. The electronic device 1 further includes an antenna 14, a first radio frequency front end 15, and a reference ground layer 23**.

The antenna 14 includes a first radiator 141. The first radiator 141 is configured to radiate a radio frequency signal to the outside and/or receive a radio frequency signal from the outside, so that the electronic device 1 can communicate with the outside through the antenna 14. In some embodiments, still as shown in FIG. **3*a*, the forming material of the frame 122 is a conductive material such as metal, the frame 122 has a first gap A, and a part that is of the frame 122 and that is located on one side of the first gap A and adjacent to the first gap A forms the first radiator 141. Specifically, a structural form of the first radiator 141** may include the following two implementations:

In a first implementation, still as shown in FIG. **3*a*, the frame 122 further has a fourth gap D, and a part that is of the frame 122 and that is located between the first gap A and the fourth gap D forms the first radiator 141. In some embodiments, the first gap A is disposed on the first side 122*a*, and the fourth gap D is disposed on the third side 122*c*. The first radiator 141 includes a third section 1411 and a fourth section 1412 that intersect. The third section 1411 is located between the first gap A and the fourth section 1412, and the third section 1411 is disposed around the first edge a of the middle plate 121. The fourth section 1412 is located between the third section 1411 and the fourth gap D, and the fourth section 1412 is disposed around the third edge c of the middle plate 121. In some embodiments, a length of the fourth section 1412 is less than or equal to ½ times a length of the third side 122*c*. It may be understood that both the first gap A and the fourth gap D may be disposed on the first side 122*a***. This is not specifically limited herein.

In a second implementation, FIG. **4*a* is a schematic diagram of another internal structure of the electronic device 1 shown in FIG. 1. In this embodiment, an end that is of the first radiator 141 and that is away from the first gap A is connected to another part of the frame 122. The end that is of the first radiator 141 and that is away from the first gap A is an end (corresponding to a K end in FIG. 4*a*) that is of the first radiator 141 and that is farthest away from the first gap A in an extension direction of the first radiator 141. In some embodiments, the first gap A is disposed on the first side 122*a*, and a part (namely, the K end) that is of the first radiator 141 and that is connected to the another part of the frame 122 is located on the third side 122*c*. The first radiator 141 includes a third section 1411 and a fourth section 1412 that intersect. The third section 1411 is located between the first gap A and the fourth section 1412, and the third section 1411 is disposed around the first edge a of the middle plate 121. The fourth section 1412 is located between the third section 1411 and the K end, and the fourth section 1412 is disposed around the third edge c of the middle plate 121**.

In the first implementation and the second implementation, the first gap A and the fourth gap D may be filled with a dielectric material, to ensure structural integrity of the frame 122. In some embodiments, there is a clearance 16 between the first radiator 141 and the middle plate 121, to ensure that the first radiator 141 has a good clearance environment, so that the first radiator 141 has a good signal transmission function. In some embodiments, another part of the frame 122 except the first radiator 141 may be obtained by being connected to the middle plate 121 and integrally formed. It may be understood that, when the another part of the frame 122 except the first radiator 141 is used as a radiator of the antenna of the electronic device, there is also a clearance 16 between the another part of the frame 122 except the first radiator 141 and the middle plate 121, to ensure that the antenna has a good clearance environment. In some embodiments, the clearances 16 may be filled with a dielectric material, to ensure structural integrity of the middle frame 12.

It may be understood that, when the forming material of the frame 122 is a non-conductive material such as plastic or resin, the frame 122 cannot form the first radiator 141, and the first radiator 141 may be disposed on an inner side of the frame 122 or embedded inside the frame 122. The frame 122 has a first frame segment, and the first radiator 141 is attached to the first frame segment or embedded inside the first frame segment. It should be noted that, in this application, that the first radiator 141 is attached to the first frame segment means that the first radiator 141 may be closely attached to the first frame segment, or may be disposed close to the first frame segment, in other words, there may be a specific small gap between the first radiator 141 and the first frame segment. In this way, the first gap A and the fourth gap D do not need to be disposed on the frame 122, to ensure structural integrity of the frame 122. In this embodiment, the structural form of the first radiator 141 may be a flexible printed circuit (flexible printed circuit, FPC) form, a laser-direct-structuring (laser-direct-structuring, LDS) form, or a mode decoration antenna (mode decoration antenna, MDA) form. This is not specifically limited herein.

The first radiator 141 has a first feed point 141*a* and a first ground point 141*b* that are disposed at an interval.

Figure 3A:
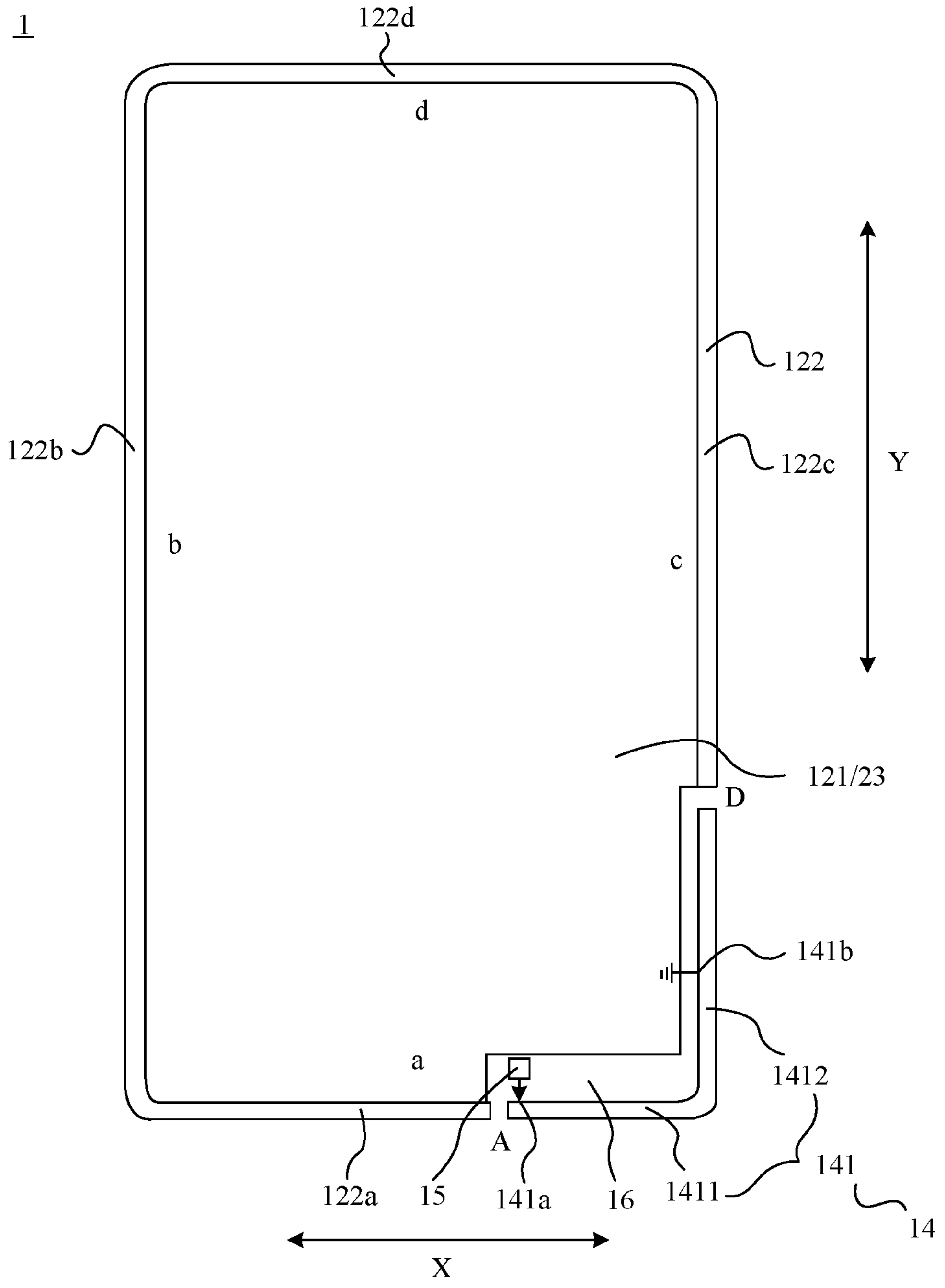
FIG. 3*a* is a schematic diagram of an internal structure of the electronic device shown in FIG. 1.
Figure 4A:
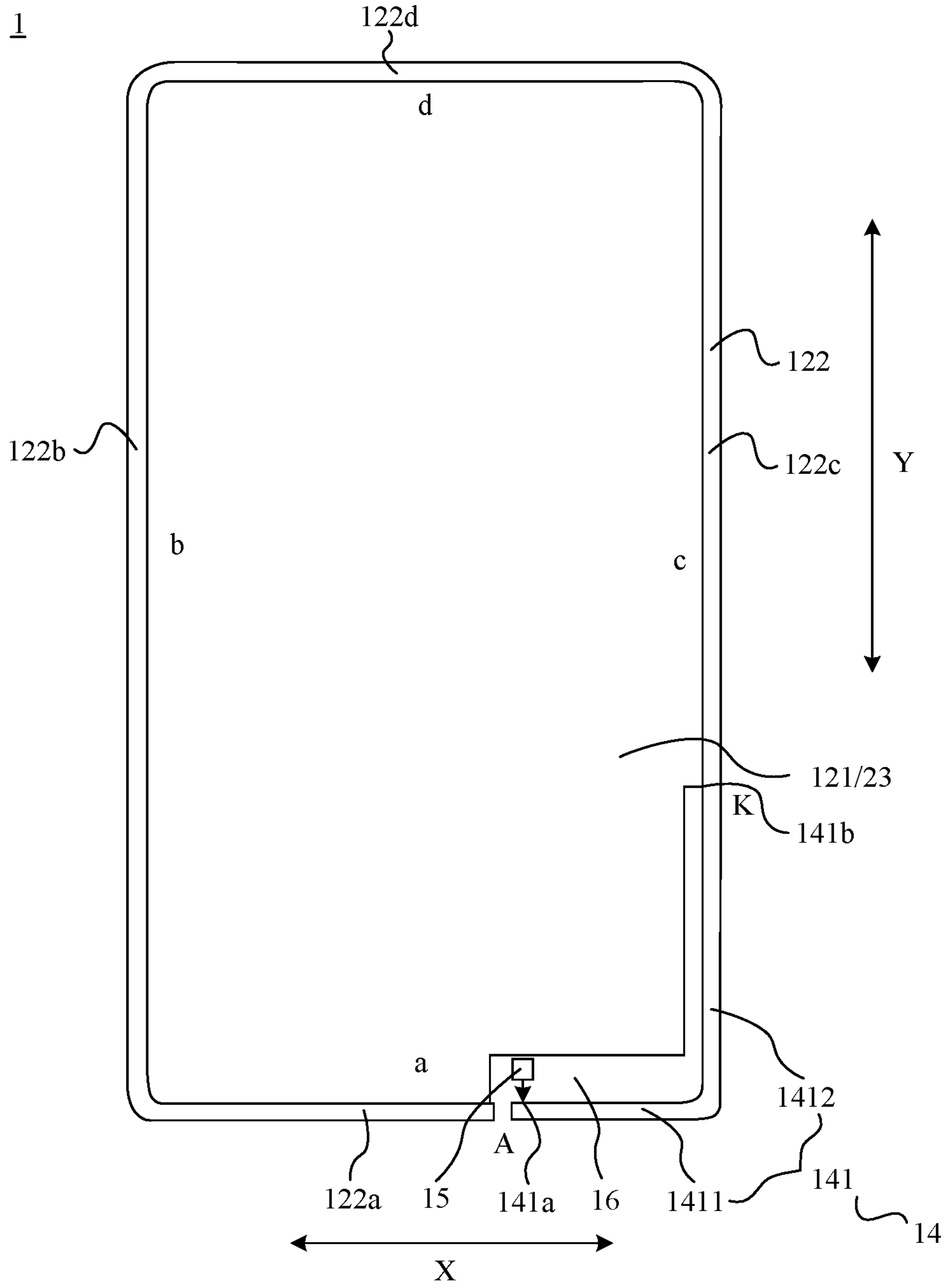
FIG. 4*a* is a schematic diagram of another internal structure of the electronic device shown in FIG. 1.

The reference ground layer 23 is electrically connected to the first ground point 141*b* of the first radiator 141. In some embodiments, the reference ground layer 23 is formed by the middle plate 121. It may be understood that the reference ground layer 23 may alternatively be formed by another structure in the electronic device 1, for example, a metal layer in a main board or the back cover 13 made of a conductive material such as metal. In some embodiments, still as shown in FIG. 3*a*, the reference ground layer 23 is electrically connected to the first ground point 141*b* through a connecting piece such as a spring or a conducting wire. In some other embodiments, still as shown in FIG. 4*a*, the first ground point 141*b* of the first radiator 141 is the end K of the first radiator 141, and the reference ground layer 23 is connected to the end K of the first radiator 141 through the frame 122, to implement a ground connection. It should be noted that the first ground point 141*b* in this application is not an actual point, and a location at which the reference ground layer 23 is electrically connected to the first radiator 141 through a ground piece or a part of the frame 122 is the first ground point 141*b*.

The first radio frequency front end 15 is electrically connected to the first feed point 141*a* of the first radiator 141, and the first radio frequency front end 15 is configured to feed a radio frequency signal to the first radiator 141 and/or receive a radio frequency signal received by the first radiator 141 from the outside. In some embodiments, the first radio frequency front end 15 includes a transmit channel and a receive channel. The transmit channel includes components such as a power amplifier and a filter. The components such as the power amplifier and the filter perform processing such as power amplification and filtering on a signal, transmit a processed signal to the first radiator 141, and transmit the processed signal to the outside through the first radiator 141. The receive channel includes components such as a low noise amplifier and a filter. The components such as the low noise amplifier and the filter perform processing such as low noise amplification and filtering on a signal received by the first radiator 141 from the outside, and then transmit a processed signal to a radio frequency chip, to implement communication between the electronic device 1 and the outside through the first radio frequency front end 15 and the antenna 14. It should be noted that the first feed point 141*a* in this application is not an actual point, and a location at which the first radio frequency front end 15 is electrically connected to the first radiator 141 is the first feed point 141*a* in this application. In some embodiments, the first radio frequency front end 15 is disposed between the middle plate 121 of the middle frame 12 and the back cover 13. In some embodiments, a frequency of the radio frequency signal fed by the first radio frequency front end 15 falls within the main resonant band of the first radiator 141.

In this embodiment of this application, locations of disposing the first feed point 141*a* and the first ground point 141*b* on the first radiator 141 are not specifically limited, provided that the first feed point 141*a* and the first ground point 141*b* are disposed at an interval in the extension direction of the first radiator 141.

Figure 3B:
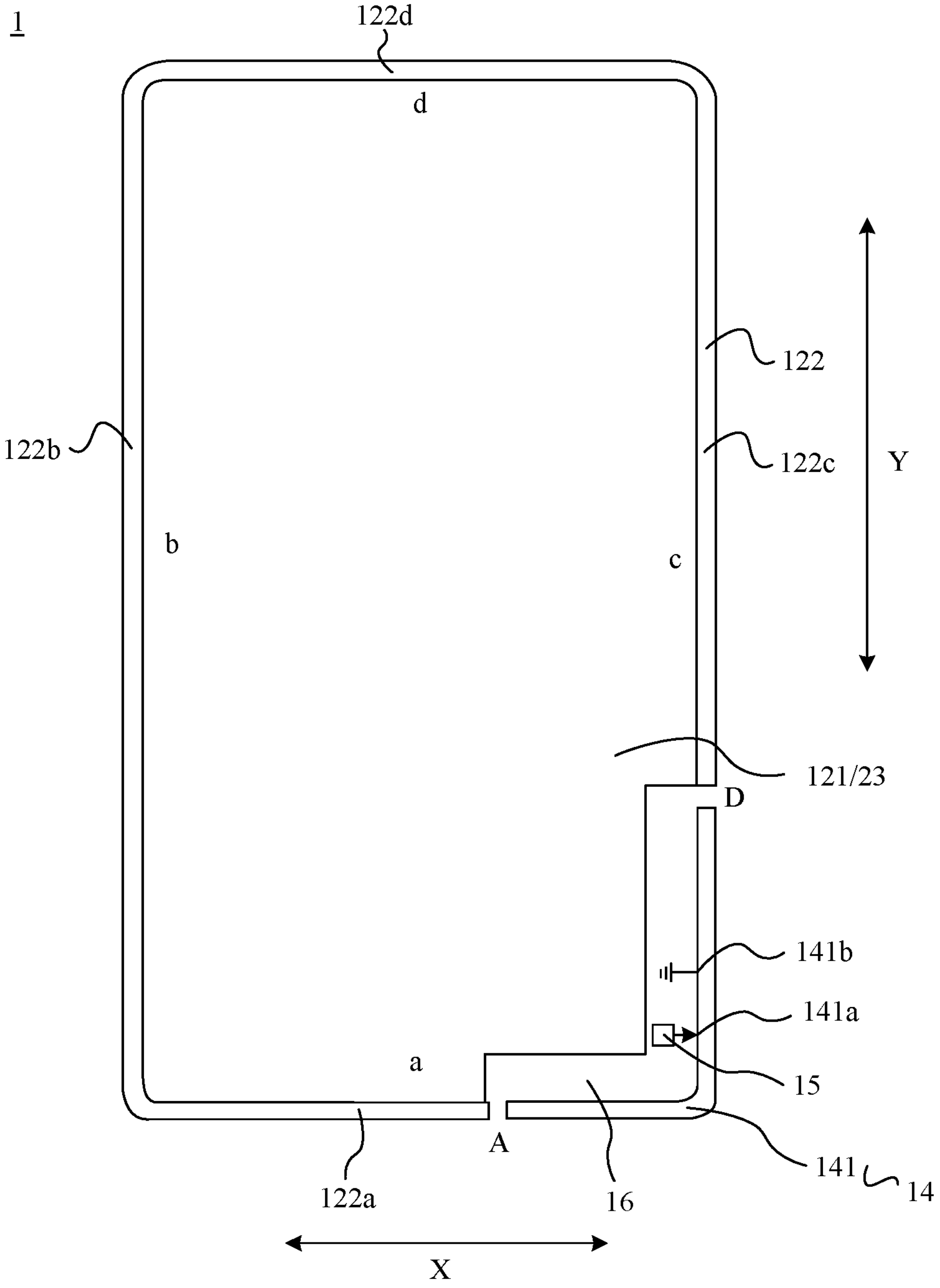
FIG. 3*b* is a schematic diagram of a structure formed after a first feed point is disposed close to a first ground point in the electronic device shown in FIG. 3*a;*

In some embodiments, as shown in FIG. 3*a*, the first feed point 141*a* is located between the first ground point 141*b* and the first gap A. For example, the first feed point 141*a* is disposed close to the first gap A. That is, a distance between the first feed point 141*a* and the first gap A in the extension direction of the first radiator 141 is defined as a first distance, and a distance between the first feed point 141*a* and the first ground point 141*b* in the extension direction of the first radiator 141 is defined as a second distance. The first distance is less than the second distance. A part that is of the first radiator 141 and that is located between the first gap A and the first ground point 141*b* forms a composite right/left handed (composite right/left handed, CRLH) antenna, and a resonant band of the CRLH antenna is the main resonant band of the first radiator 141. It may be understood that, on the premise that the first feed point 141*a* is disposed between the first ground point 141*b* and the first gap A, if the first feed point 141*a* is disposed close to the first ground point 141*b*, the first distance is greater than the second distance. FIG. 3*b* is a schematic diagram of a structure formed after the first feed point 141*a* is disposed close to the first ground point 141*b* in the electronic device 1 shown in FIG. 3*a*. In this embodiment, the part that is of the first radiator 141 and that is located between the first gap A and the first ground point 141*b* forms an inverted-F (inverted-F antenna, IFA) antenna, and a resonant band of the IFA antenna is the main resonant band of the first radiator 141. It may be understood that the first feed point 141*a* may alternatively be located on a side that is of the first ground point 141*b* and that is close to the fourth gap D, in other words, the first feed point 141*a* is located between the first ground point 141*b* and the fourth gap D.

Figure 4B:
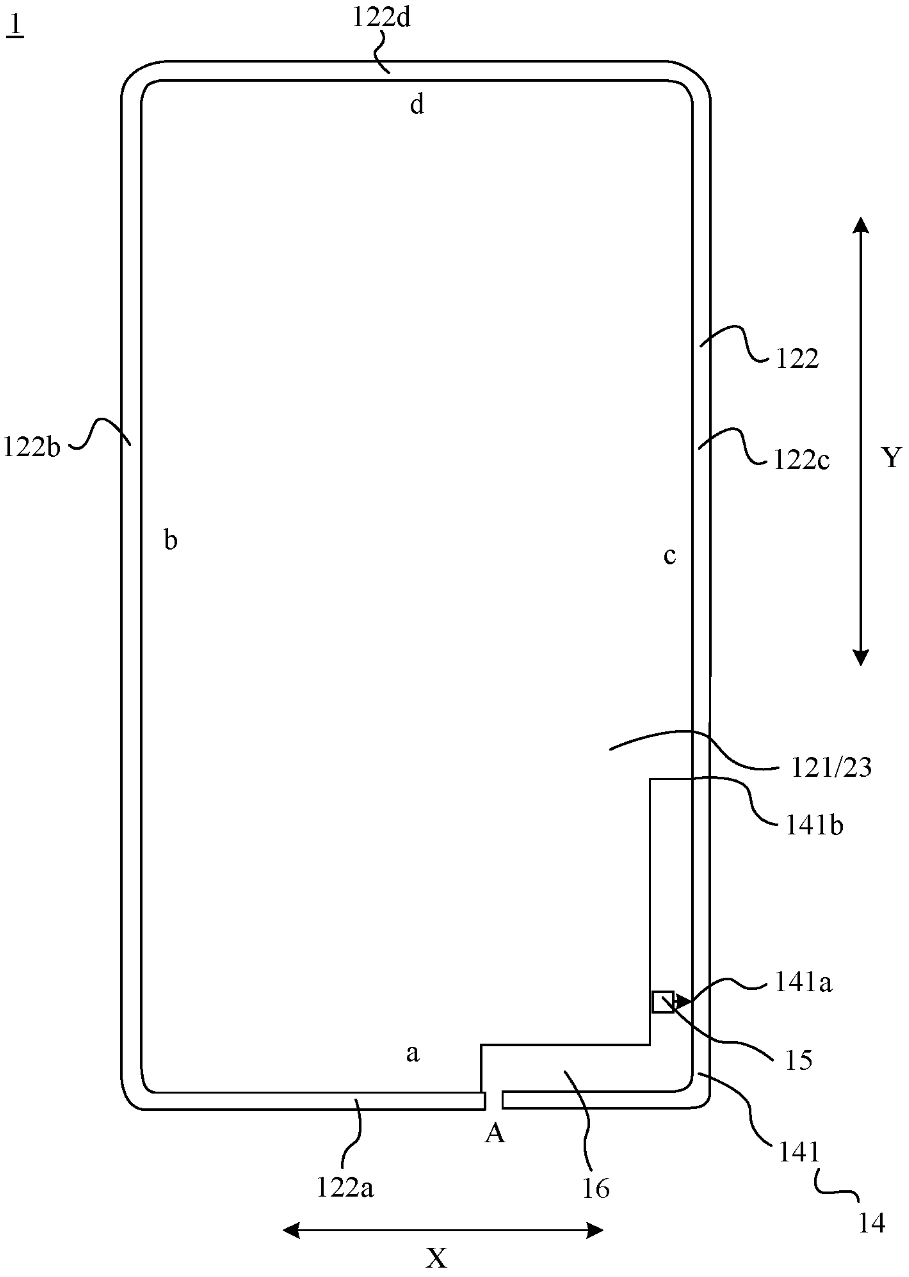
FIG. 4*b* is a schematic diagram of a structure formed after a first feed point is disposed close to a first ground point in the electronic device shown in FIG. 4*a;*

Similarly, as shown in FIG. 4*a*, the first feed point 141*a* is disposed close to the first gap A. That is, a distance between the first feed point 141*a* and the first gap A in the extension direction of the first radiator 141 is defined as a first distance, and a distance between the first feed point 141*a* and the first ground point 141*b* in the extension direction of the first radiator 141 is defined as a second distance. The first distance is less than the second distance. In this case, the first radiator 141 forms a CRLH antenna, and a resonant band of the CRLH antenna is the main resonant band of the first radiator 141. It may be understood that the first feed point 141*a* may alternatively be disposed close to the first ground point 141*b*, that is, the first distance is greater than the second distance. FIG. 4*b* is a schematic diagram of a structure formed after the first feed point 141*a* is disposed close to the first ground point 141*b* in the electronic device 1 shown in FIG. 4*a*. In this embodiment, a part that is of the first radiator 141 and that is located between the first gap A and the first ground point 141*b* forms an IFA antenna, and a resonant band of the IFA antenna is the main resonant band of the first radiator 141.

Figure 5:
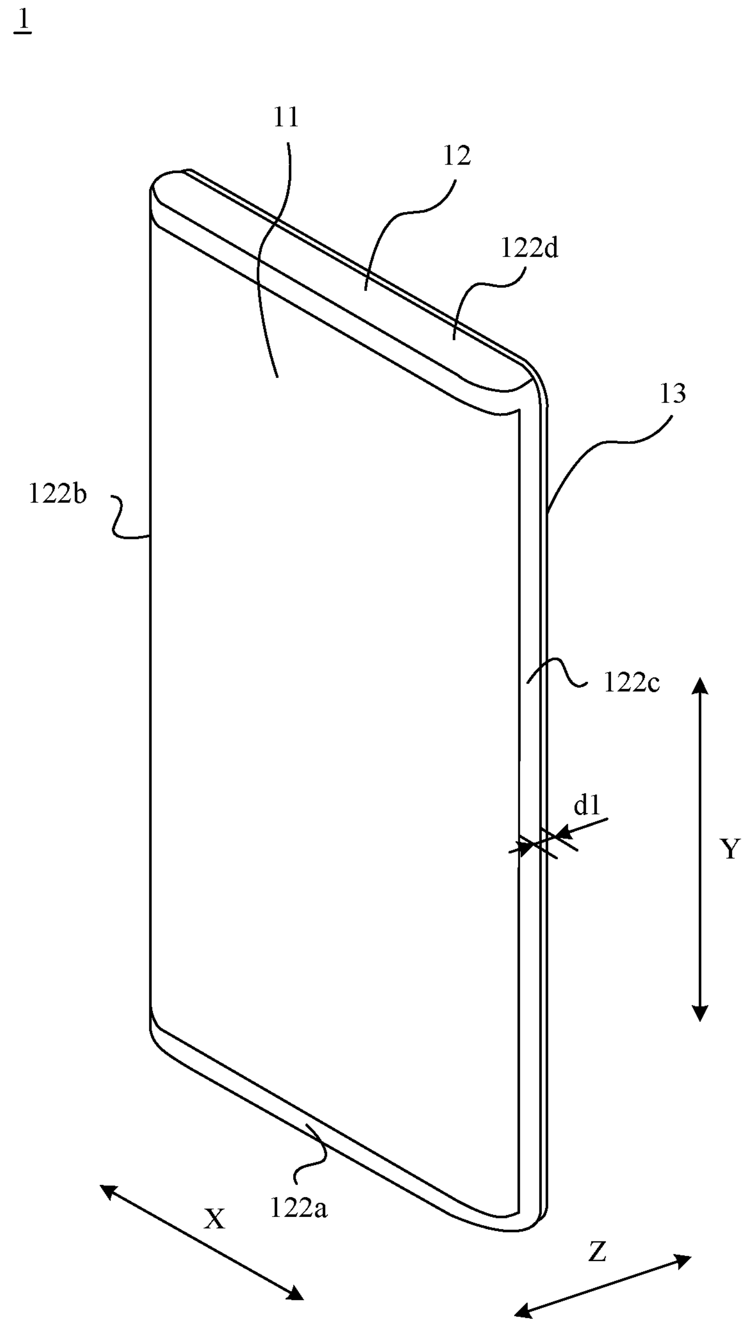
FIG. 5 is a three-dimensional diagram of an electronic device with a curved screen according to some embodiments of this application.

The antenna in the electronic device 1 provided in this embodiment of this application transmits or receives a signal through the conductive frame 122, a conductive radiator disposed on an inner side of the non-conductive frame 122, or a conductive radiator embedded inside the non-conductive frame 122. With popularity of a large screen such as a curved screen, at least two opposite edges of the display 11 are bent toward the back cover 13, to form an electronic device with the curved screen. For example, FIG. 5 is a three-dimensional diagram of the electronic device 1 with the curved screen according to some embodiments of this application. In this embodiment, edges of the display 11 (FIG. 5 shows only opposite edges on two sides, and the edges may alternatively be peripheral edges) are bent toward the back cover 13. In this case, on the premise that a thickness of the electronic device 1 is unchanged, a dimension (namely, dl in FIG. 5) of the frame 122 in a thickness direction (namely, a Z direction, where the Z direction is perpendicular to an X direction, and the Z direction is also perpendicular to a Y direction) of the electronic device 1 is smaller, and curved parts on two sides of the display 11 block the frame 122 in the thickness direction (namely, the Z direction in FIG. 5) of the electronic device, or the frame 122 is projected on the display 11 in the thickness direction (in other words, the display 11 is located on an orthographic projection area on an XY plane). Consequently, the antenna implements signal radiation through the conductive frame 122, the conductive radiator disposed on the inner side of the non-conductive frame 122, or the conductive radiator embedded inside the non-conductive frame 122, resulting in low radiation efficiency.

Figure 6:
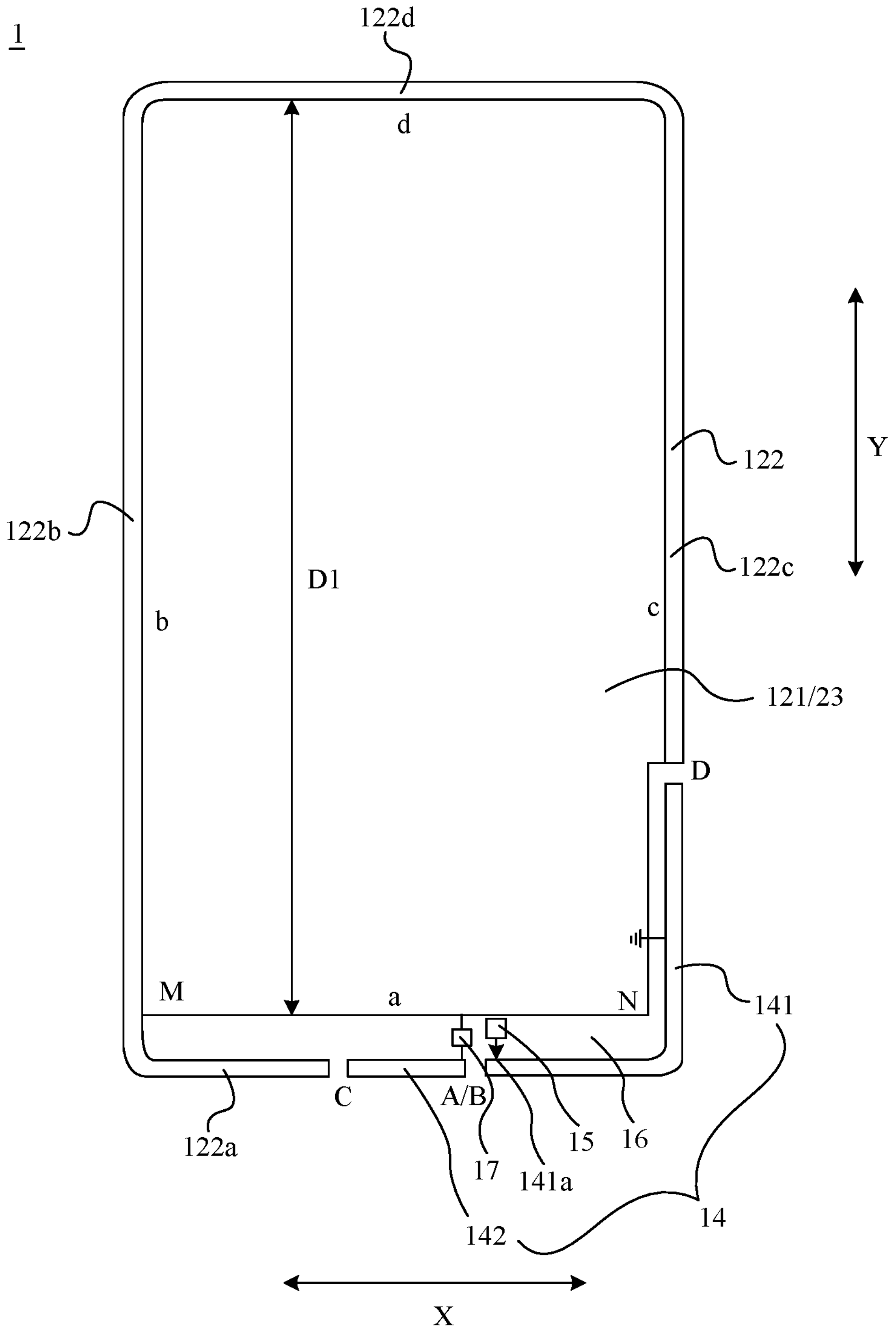
FIG. 6 is a schematic diagram of another internal structure of the electronic device shown in FIG. 1.

To improve radiation efficiency of the antenna, refer to FIG. 6. FIG. 6 is a schematic diagram of another internal structure of the electronic device 1 shown in FIG. 1. In this embodiment, in addition to the first radiator 141 described in any one of the foregoing embodiments, the antenna 14 further includes a second radiator 142. The second radiator 142 and the first radiator 141 are disposed at an interval, and a signal on the first radiator 141 may be coupled to the second radiator 142. The reference ground layer 23 has a first edge, and a second edge and a third edge that are respectively connected to two ends of the first edge. In some embodiments, the first edge a of the middle plate 121 forms the first edge of the reference ground layer 23, the second edge b of the middle plate 121 forms the second edge of the reference ground layer 23, and the third edge c of the middle plate 121 forms the third edge of the reference ground layer 23. The first edge a of the middle plate 121, the second edge b of the middle plate 121, and the third edge c of the middle plate 121 respectively represent three sequentially connected side walls of the middle plate 121. The second radiator 142 is electrically connected to the first edge a of the middle plate 121, an end section that is of the second edge b and that is connected to the first edge a, or an end section that is of the third edge c and that is connected to the first edge a. The first edge a may be a straight edge, may be a cambered edge, or may be a wavy edge. This is not specifically limited herein. The first edge a has a first end M and a second end N. The first end M of the first edge a is an end that is of the first edge a and that is connected to the second edge b, and the second end N of the first edge a is an end that is of the first edge a and that is connected to the third edge c. The end section that is of the second edge b and that is connected to the first edge a is a section in which a distance to the first end M falls within a first preset length range, and the first preset length may be ½ times, ¼ times, or ⅛ times a length of the second edge b. This is not specifically limited herein. The end section that is of the third edge c and that is connected to the first edge a is a section in which a distance between to the second end N falls within a second preset length range, and the second preset length may be ½ times, ¼ times, or ⅛ times a length of the third edge c. This is not specifically limited herein.

It should be noted that, when an orthographic projection area of the second radiator 142 on a plane of the middle plate 121 is in the middle plate 121, the second radiator 142 may alternatively be connected to an area in which a distance between a largest plane of the middle plate 121 and each of the first edge a, the end section that is of the second edge b and that is connected to the first edge a, and the end section that is of the third edge c and that is connected to the first edge is 50 mm.

In some embodiments, still as shown in FIG. 6, the forming material of the frame 122 is a conductive material such as metal. In addition to the first gap A, the frame 122 further has a second gap B and a third gap C. A part that is of the frame 122 and that is located between the second gap B and the third gap C forms the second radiator 142. Specifically, a relative location relationship between each of the first gap A, the second gap B, and the third gap C and the first radiator 141 may include the following Embodiment 1 and Embodiment 2.

Embodiment 1: Still as shown in FIG. 6, the second gap B and the first gap A are a same gap, and the third gap C is located on a side that is of the second gap B and that is away from the first radiator 141. In other words, the first gap A and the second gap B are located between the third gap C and the first radiator 141. In this case, the second radiator 142 and the first radiator 141 are adjacent and disposed at an interval, and a distance between the second radiator 142 and the first radiator 141 is close, so that the antenna 14 has a compact structure, and occupies less space on the frame 122.

In Embodiment 1, the third gap C may also be filled with a dielectric material, to ensure structural integrity of the frame 122. Optionally, there is a clearance 16 between the second radiator 142 and the middle plate 121, to ensure that the second radiator 142 has a good clearance environment, so that the second radiator 142 has good signal radiation performance. In some embodiments, the clearance 16 may be filled with a dielectric material, to ensure structural integrity of the middle frame 12.

Figure 7:
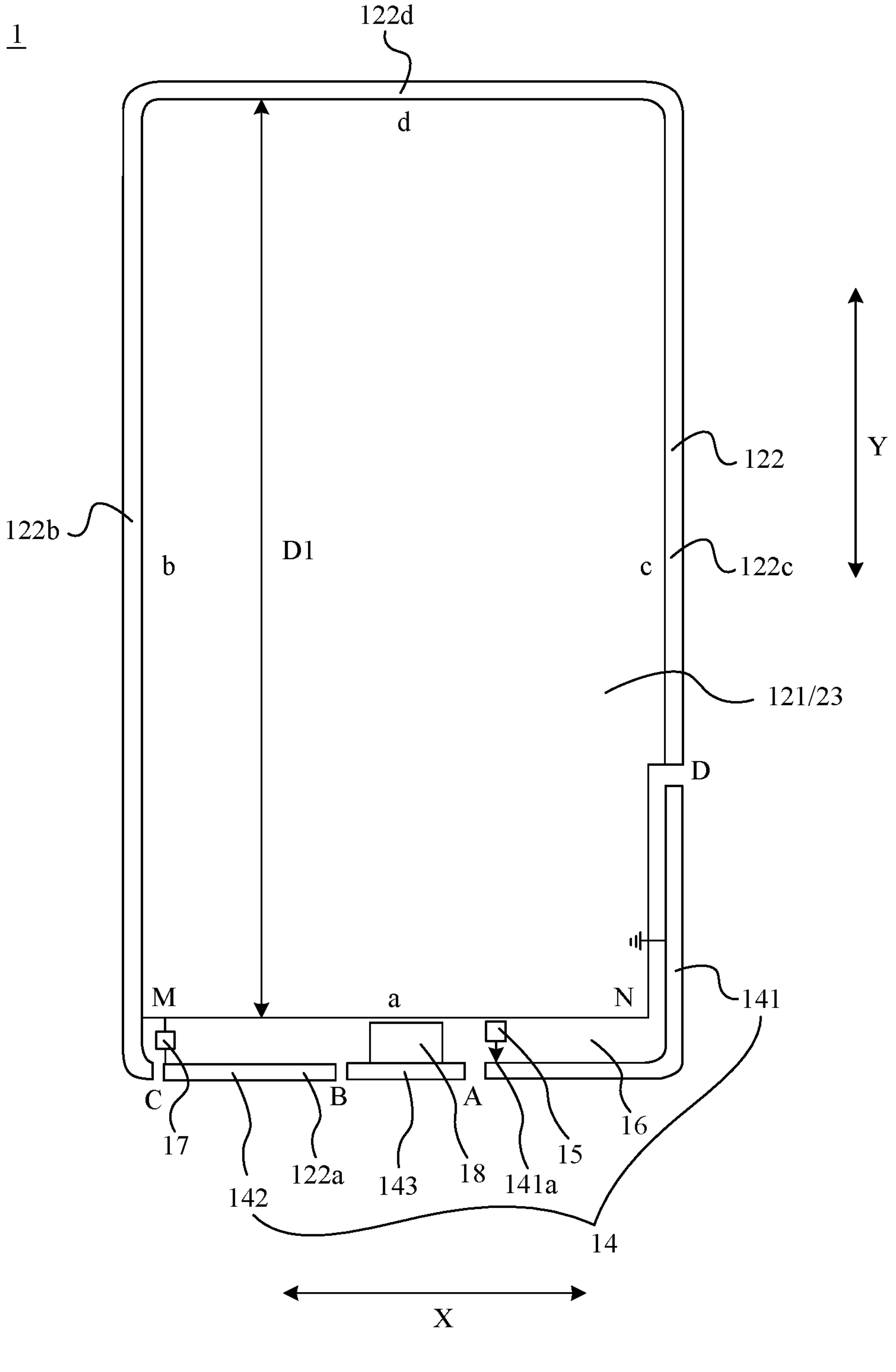
FIG. 7 is a schematic diagram of another internal structure of the electronic device shown in FIG. 1.
Figure 8:
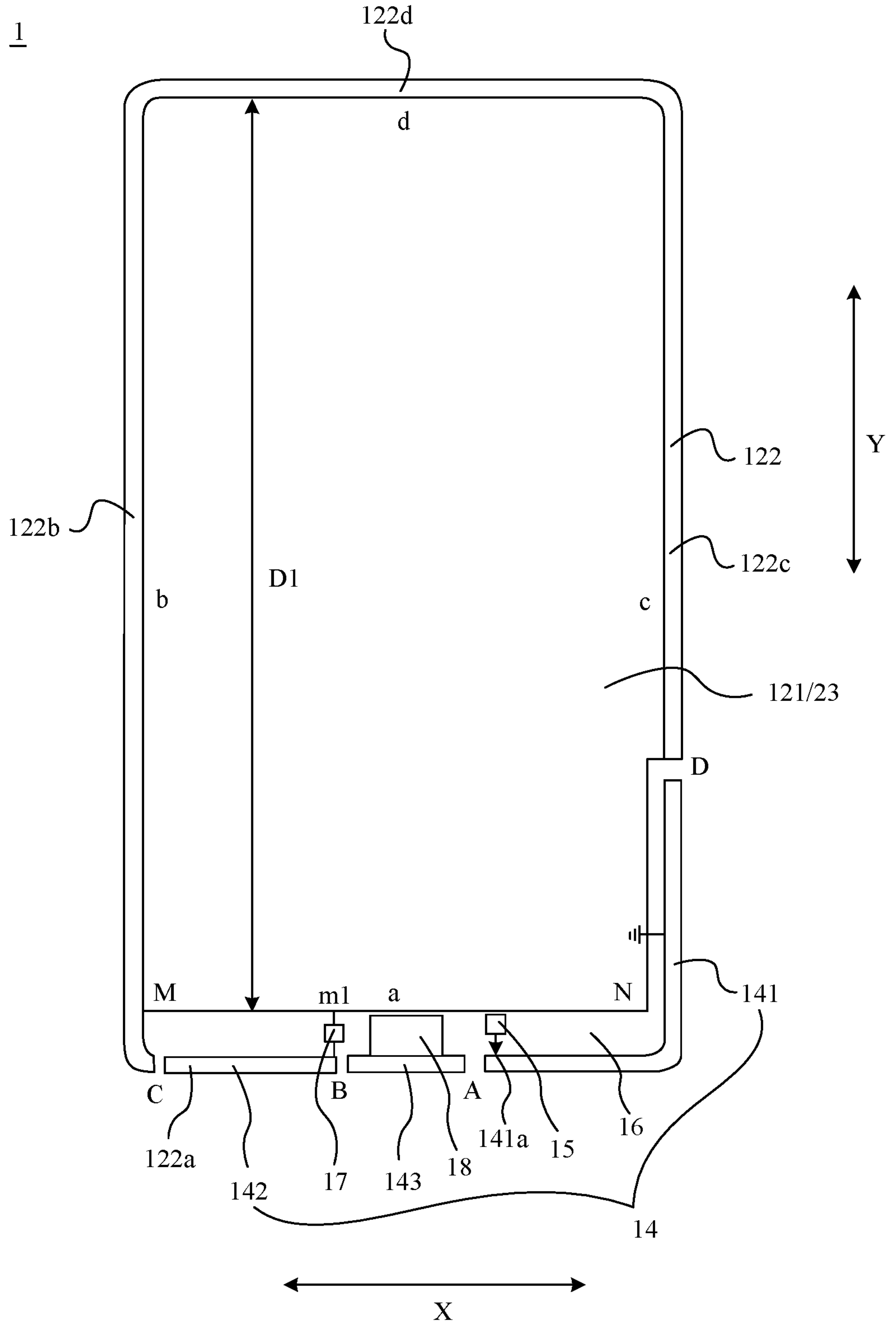
FIG. 8 is a schematic diagram of another internal structure of the electronic device shown in FIG. 1.
Figure 9:
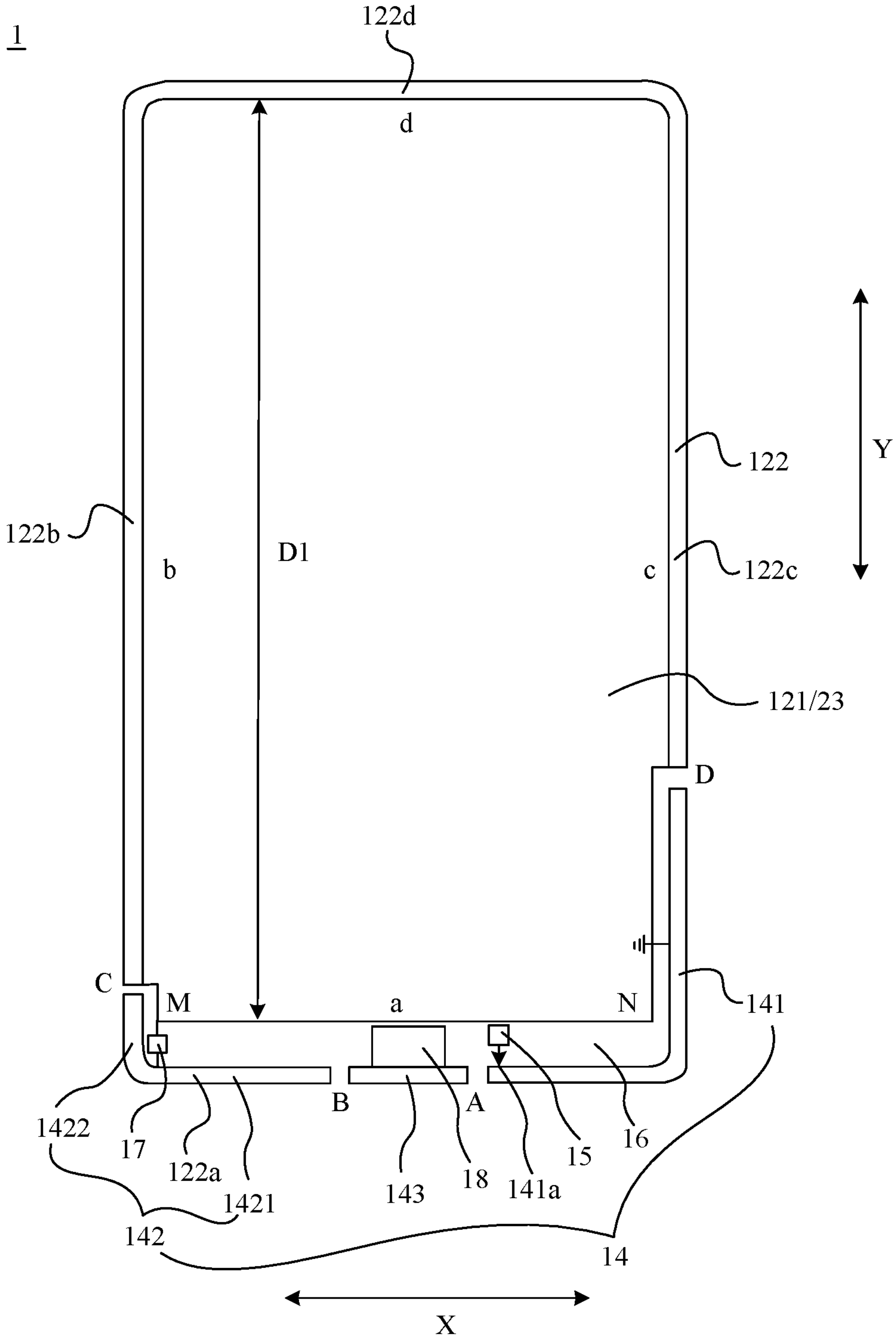
FIG. 9 is a schematic diagram of another internal structure of the electronic device shown in FIG. 1.

Embodiment 2: Refer to FIG. 7 to FIG. 9. FIG. 7 to FIG. 9 are schematic diagrams of other three internal structures of the electronic device 1 shown in FIG. 1. In this embodiment, the second gap B and the first gap A are disposed at an interval. In an extension direction of the frame 122, the second gap B and the third gap C are located on a side that is of the first gap A and that is away from the first radiator 141. In other words, the first radiator 141 is located on a side of the first gap A, and the second gap B and the third gap C are located on the other side of the first gap A. The third gap C is located on a side that is of the second gap B and that is away from the first gap A, in other words, the second gap B is located between the third gap C and the first gap A. A part that is of the frame 122 and that is located between the second gap B and the first gap A forms a floating conductor 143. It may be understood that at least one gap may be added to the part that is of the frame 122 and that is between the second gap B and the first gap A, to form a plurality of floating conductors 143 between the second gap B and the first gap A. The floating conductor 143 is not connected to a reference ground (including the reference ground layer 23). When a radio frequency signal is fed at the first feed point 141*a*, the second radiator 142 can be indirectly coupled to the first radiator 141 through the floating conductor 143. In this case, at least one floating conductor 143 is spaced between the second radiator 142 and the first radiator 141. A location of the second radiator 142 may be adjusted to a location with a better clearance environment through the at least one floating conductor 143, so that the second radiator 142 is electrically connected to the first edge a of the middle plate 121.

Based on Embodiment 2, both the first gap A and the second gap B are disposed on the first side 122*a* of the frame 122. In some embodiments, the first gap A and the second gap B are symmetrically disposed with respect to a center of the first side 122*a*. In this way, appearance effect of the frame 122 is better. In some embodiments, for example, a universal serial bus (universal serial bus, USB) device 18 is disposed on an inner side of the floating conductor 143 and is attached to the floating conductor 143. The inner side of the floating conductor 143 is a side that is of the floating conductor 143 and that faces the inside of the electronic device when the floating conductor 143 is applied to the electronic device. In addition, that the USB device 18 is attached to the floating conductor 143 means that the USB device 18 may be closely attached to the floating conductor 143, or may be disposed close to the floating conductor 143, in other words, there may be a specific small gap between the USB device 18 and the floating conductor 143.

In Embodiment 2, based on a case that both the first gap A and the second gap B are disposed on the first side 122*a* of the frame 122, in some embodiments, still as shown in FIG. 7 to FIG. 9, the second gap B is disposed closer to the first end M of the first edge a than the first gap A. That is, a distance between the first gap A and the first end M of the first edge a in an extension direction of the first side 122*a* is greater than a distance between the second gap B and the first end M of the first edge a in the extension direction of the first side 122*a*. It may be understood that the second gap B may alternatively be disposed closer to the second end N of the first edge a than the first gap A. That is, a distance between the first gap A and the first end M of the first edge a in an extension direction of the first side 122*a* is less than a distance between the second gap B and the first end M of the first edge a in the extension direction of the first side 122*a*. This is not specifically limited herein.

When the second gap B is disposed closer to the first end M of the first edge a than the first gap A, the third gap C may be disposed on the first side 122*a* of the frame 122, or may be disposed on the second side 122*b* of the frame 122. In some embodiments, still as shown in FIG. 7, the third gap C is disposed on the first side 122*a* of the frame 122. In some other embodiments, FIG. 9 is a schematic diagram of another internal structure of the electronic device 1 shown in FIG. 1. In this embodiment, the third gap C is disposed on the second side 122*b* of the frame 122. In this case, the second radiator 142 includes a first section 1421 and a second section 1422 that intersect. The first section 1421 is located between the second gap B and the second section 1422, and the first section 1421 is disposed around the first edge a of the middle plate 121. The second section 1422 is located between the first section 1421 and the third gap C, and the second section 1422 is disposed around the second edge b of the middle plate 121. In some embodiments, a length of the second section 1422 is less than or equal to ¼ times a length of the second side 122*b*.

In Embodiment 2, the second gap B and the third gap C may also be filled with a dielectric material, to ensure structural integrity of the frame 122. Optionally, there are clearances 16 between the second radiator 142 and the middle plate 121, and between the floating conductor 143 and the middle plate 121, to ensure that the second radiator 142 and the floating conductor 143 have a good clearance environment, so that the second radiator 142 and the floating conductor 143 have good signal radiation performance. In some embodiments, the clearances 16 may be filled with a dielectric material, to ensure structural integrity of the middle frame 12.

It may be understood that, when the forming material of the frame 122 is a non-conductive material such as plastic or resin, the frame 122 cannot form the second radiator 142 described in Embodiment 1 and Embodiment 2. The second radiator 142 may be disposed on an inner side of the frame 122 or embedded inside the frame 122. The frame 122 has a second frame segment, and the second radiator 142 is attached to the second frame segment or embedded inside the second frame segment. In this way, the second gap B and the third gap C do not need to be disposed on the frame 122, to ensure structural integrity of the frame 122. In this embodiment, a structural form of the second radiator 142 may be a flexible printed circuit (flexible printed circuit, FPC) form, a laser-direct-structuring (laser-direct-structuring, LDS) form, or a mode decoration antenna (mode decoration antenna, MDA) form. This is not specifically limited herein.

In Embodiment 1 and Embodiment 2, as shown in FIG. 6 to FIG. 9, the reference ground layer 23 can be excited within a main resonant band of the first radiator 141 to generate a ½ wavelength characteristic mode in a first direction. To meet this requirement, generally, an electrical length of the reference ground layer 23 in the first direction is a ½ wavelength of the main resonant band of the first radiator 141. For example, if the main resonant band of the first radiator 141 is B28 (namely, 703 MHz to 803 MHz), the electrical length of the reference ground layer 23 in the first direction is a ½ wavelength of a main resonant frequency of 703 MHz to a ½ wavelength of a main resonant frequency of 803 MHz.

The electrical length of the reference ground layer 23 in the first direction is a physical length (namely, mechanical length or geometric length) D1 of the reference ground layer 23 in the first direction multiplied by a ratio of time $t_1$ of transmitting an electrical or electromagnetic signal in the reference ground layer 23 in the first direction to time t2 required for the signal to pass through a same distance in free space as the physical length of the reference ground layer 23 in the first direction. In other words, the electrical length L' of the reference ground layer 23 in the first direction may meet the following formula: $L'=D1\times t_1/t_2$. Alternatively, the electrical length of the reference ground layer 23 in the first direction may be a ratio of a physical length (namely, mechanical length or geometric length) D1 of the reference ground layer 23 in the first direction to a wavelength λ of an electromagnetic wave transmitted by the reference ground layer 23. In other words, the electrical length L' of the reference ground layer 23 in the first direction may meet the following formula: $L'=D1/\lambda$.

In addition, the first direction is parallel to a plane on which the reference ground layer 23 is located and perpendicular to an extension direction of the first edge a. When the first edge a is a straight edge, the extension direction of the first edge a is parallel to the first edge a. When the first edge a is a wavy edge, the extension direction of the first edge a is consistent with an extension direction of a center line of the wavy edge. The center line of the wavy edge is a straight line passing through a middle section of the first edge part between any adjacent wave crest point and trough point of the wave edge. The middle section of the first edge part between the adjacent wave crest point and trough point is a section in which a central point of the middle section coincides with a central point of the first edge part, and a length of the middle section is ½ times, ⅗ times, or the like, a length of the first edge part. This is not specifically limited herein. When the first edge a is a cambered edge, the extension direction of the first edge a is consistent with an approximately straight-line extension direction of the first edge a. An included angle between the approximately straight-line extension direction of the first edge a and any section on the first edge a is less than or equal to a first preset angle, and the first preset angle includes but is not limited to 15°, 20°, or 30°. This is not specifically limited herein. In some embodiments, as shown in FIG. 7, the first edge a is a straight edge, and the first direction is a direction perpendicular to the first edge a. A parasitic resonant band generated by the second radiator 142 when a radio frequency signal is fed at the first feed point 141*a* is lower than a main resonant band of the first radiator 141. In some embodiments, the parasitic resonant band generated by the second radiator 142 when the radio frequency signal is fed at the first feed point 141*a* is close to the main resonant band of the first radiator 141.

In this way, the second radiator 142 is added, so that the parasitic resonant band generated through coupling between the second radiator 142 and the first radiator 141 when the radio frequency signal is fed at the first feed point 141*a* is lower than the main resonant band of the first radiator 141. Further, the second radiator 142 is electrically connected to the first edge a of the reference ground layer 23, so that the electrical length of the reference ground layer 23 in the first direction is the ½ wavelength of the main resonant band of the first radiator 141, in other words, the reference ground layer 23 can be excited within the main resonant band of the first radiator 141 to generate the ½ wavelength characteristic mode in the first direction. In this way, the first radiator 141 is excited to generate resonance, and the second radiator 142 excites the reference ground layer 23, to improve radiation efficiency of the antenna 14.

In some embodiments, still as shown in FIG. 6 to FIG. 9, the second radiator 142 is electrically connected to the first edge a of the reference ground layer 23 through a lumped parameter element 17. The lumped parameter element 17 includes but is not limited to a capacitor, an inductor, or a circuit obtained by connecting one or two of an inductor or a capacitor in parallel, in series, or in series-parallel. In some embodiments, the lumped parameter element 17 is an inductor, and an inductance value of the inductor may be 18 nH. In this way, an electrical length of the second radiator 142 is adjusted through the lumped parameter element 17, to reduce a physical length of the second radiator 142 while adjusting the parasitic resonant band generated by the second radiator 142 when the radio frequency signal is fed at the first feed point 141*a* to be lower than the main resonant band of the first radiator 141. Therefore, an occupation length of the antenna 14 on the frame 122 can be reduced.

The second radiator 142 is electrically connected to the first edge a of the middle plate 121. Specifically, the second radiator 142 may be electrically connected to a middle section of the first edge a of the middle plate 121, or the second radiator 142 may be electrically connected to an end section of the first edge a of the middle plate 121. This is not specifically limited herein.

In some embodiments, still as shown in FIG. 6, the second radiator 142 is electrically connected to the middle section of the first edge a of the middle plate 121. The middle section of the first edge a is a section in which a distance to a center point of the first edge a falls within a third preset length range, and the third preset length may be ¼ times, ⅒ times, or ⅛ times a length of the first edge a.

In some other embodiments, the second radiator 142 is electrically connected to the end section of the first edge a of the middle plate 121. The end section of the first edge a is a section in which a distance to the first end M or the second end N of the first edge a falls within a fourth preset length range. The second end N is an end that is of the first edge a and that is opposite to the first end M. In some embodiments, the fourth preset length may be ½ times the length of the first edge a. In this way, when the second radiator 142 excites the reference ground layer 23, a first direction mode (namely, longitudinal mode) of the reference ground layer 23 is fully excited, so that radiation efficiency of the antenna 14 can be further improved. In some specific embodiments, as shown in FIG. 7 to FIG. 9, the second gap B is disposed closer to the first end M of the first edge a than the first gap A, and the second radiator 142 is electrically connected to an end section in which the first end M of the first edge a is located. The end section in which the first end M is located is a section in which a distance between to the first end M of the first edge a falls within the fourth preset length range. Because a distance between the end section in which the first end M is located and the second radiator 142 is short, an electrical connection path between the second radiator 142 and the end section in which the first end M is located is short. This facilitates wiring. When the second radiator 142 is electrically connected to the end section in which the first end M of the first edge a is located, for example, as shown in FIG. 7, the second radiator 142 is electrically connected to a first end M location of the end section in which the first end M is located. For another example, as shown in FIG. 8, the second radiator 142 is electrically connected to a ml location of the end section in which the first end M is located.

Figure 10:
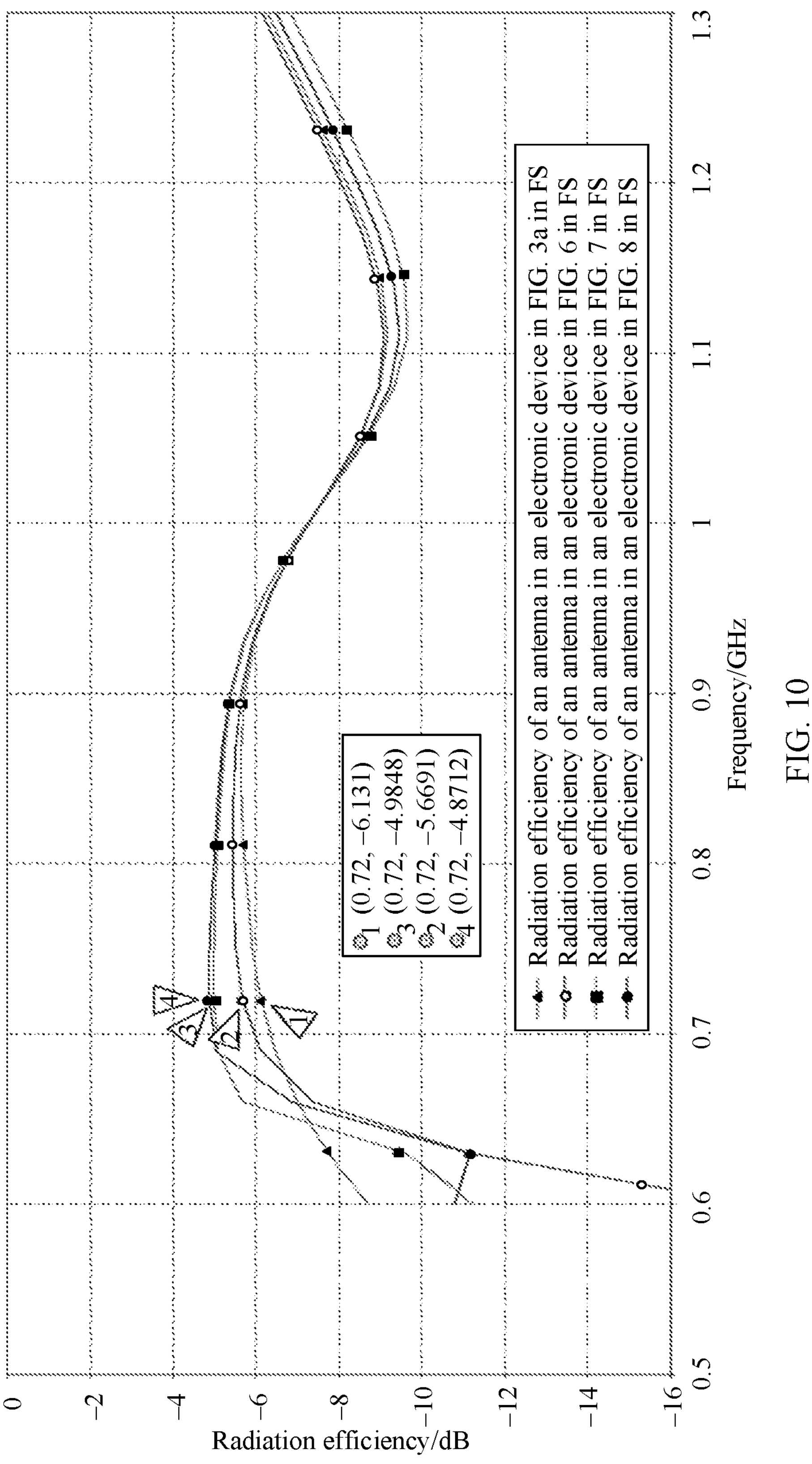
FIG. 10 is a curve comparison diagram of radiation efficiency at which antennas in the electronic devices shown in FIG. 3*a*, FIG. 6, FIG. 7, and FIG. 8 generate an antenna band of B28 (namely, 703 MHz to 803 MHz) in a free space (free space, FS) state.
Figure 11:
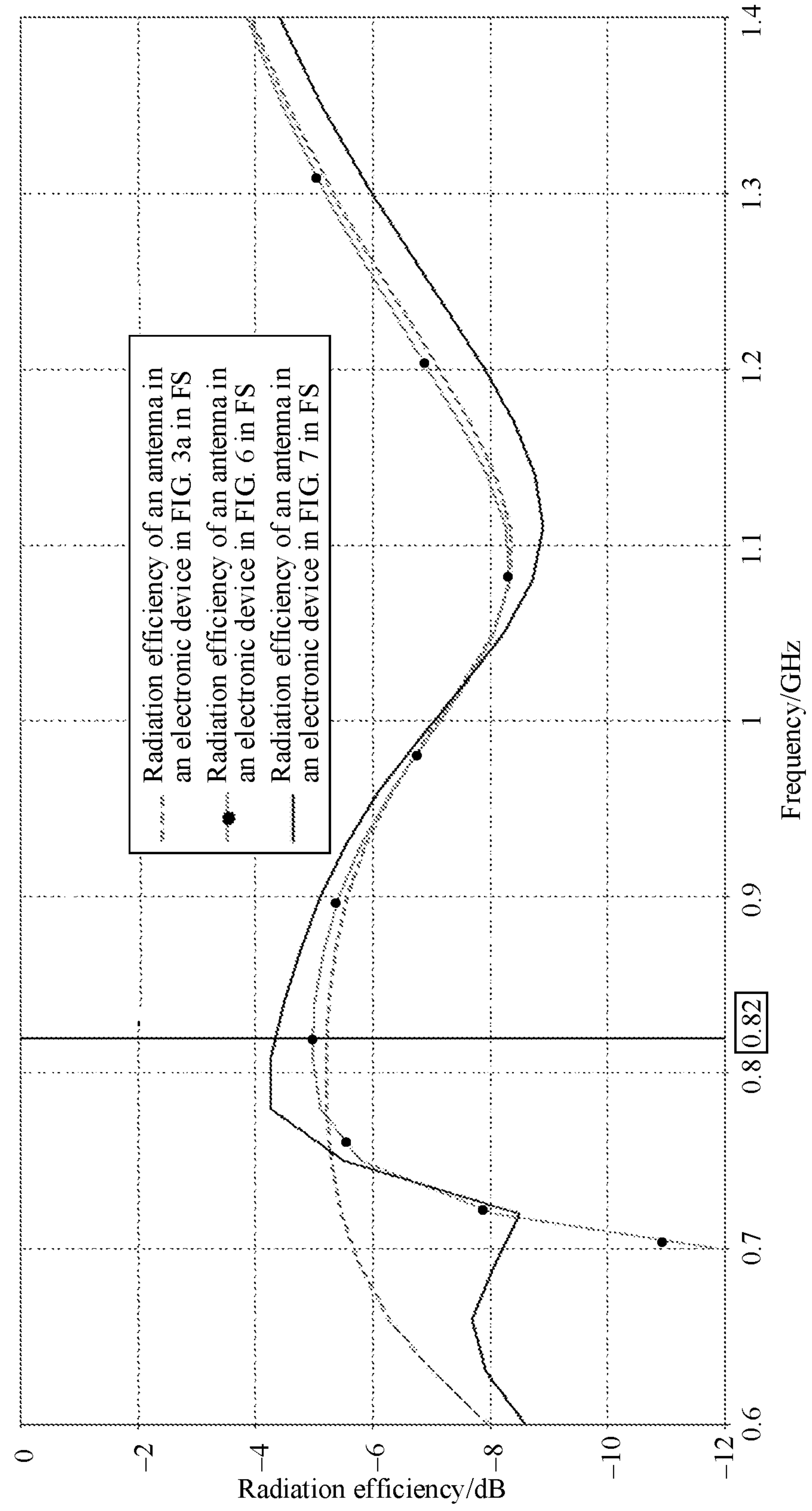
FIG. 11 is a curve comparison diagram of radiation efficiency at which antennas in the electronic devices shown in FIG. 3*a*, FIG. 6, and FIG. 7 generate an antenna band of B5 (namely, 824 MHz to 894 MHz) in an FS state.
Figure 12:
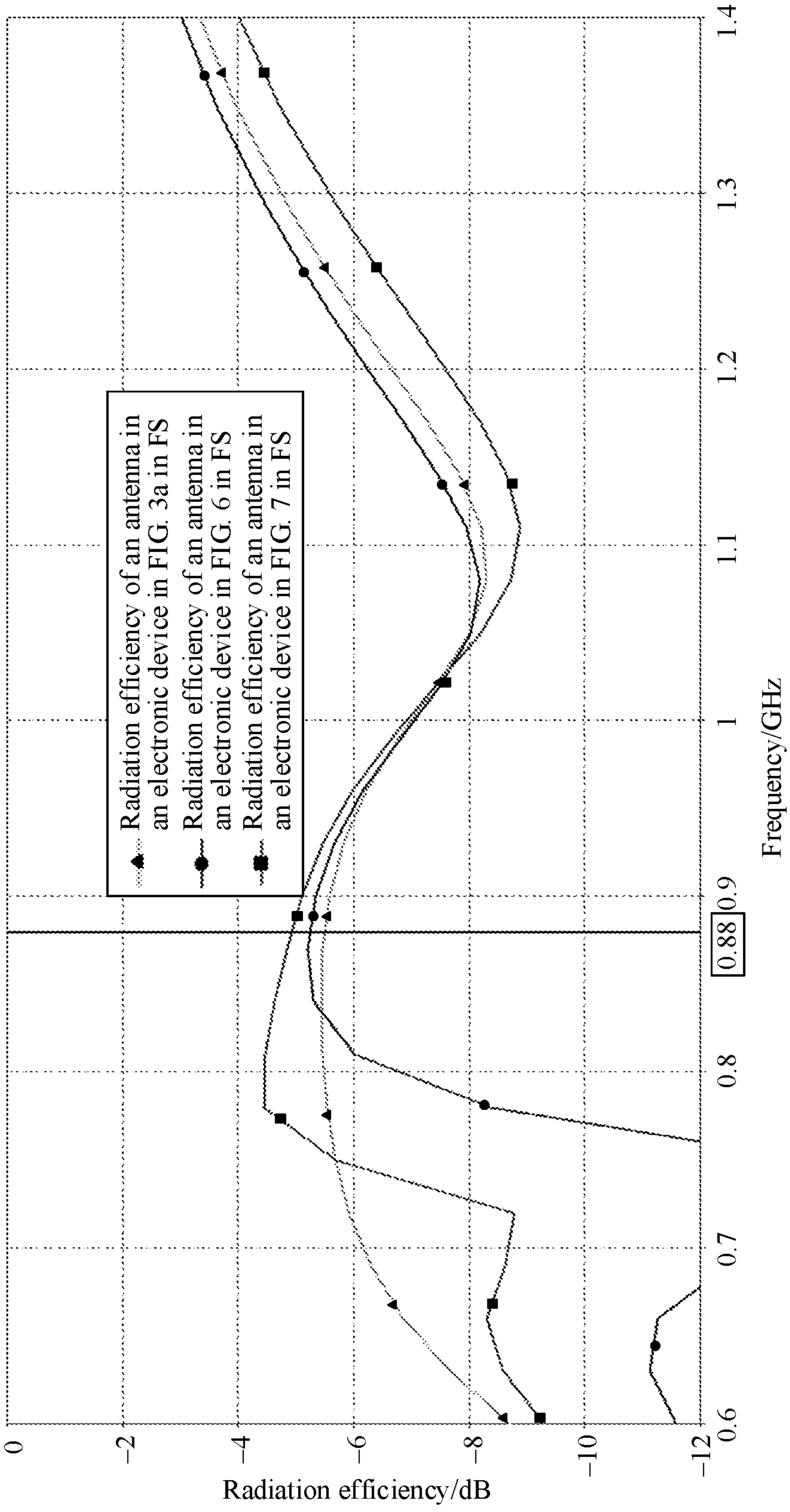
FIG. 12 is a curve comparison diagram of radiation efficiency at which antennas in the electronic devices shown in FIG. 3*a*, FIG. 6, and FIG. 7 generate an antenna band of B8 (namely, 880 MHz to 960 MHz) in an FS state.

Refer to FIG. 10 to FIG. 12. FIG. 10 is a curve comparison diagram of radiation efficiency at which the antennas 14 in the electronic devices 1 shown in FIG. 3*a*, FIG. 6, FIG. 7, and FIG. 8 generate an antenna band of B28 (namely, 703 MHz to 803 MHz) in a free space (FS) state. FIG. 11 is a curve comparison diagram of radiation efficiency at which the antennas 14 in the electronic devices 1 shown in FIG. 3*a*, FIG. 6, and FIG. 7 generate an antenna band of B5 (namely, 824 MHz to 894 MHz) in an FS state. FIG. 12 is a curve comparison diagram of radiation efficiency at which the antennas 14 in the electronic devices 1 shown in FIG. 3*a*, FIG. 6, and FIG. 7 generate an antenna band of B8 (namely, 880 MHz to 960 MHz) in an FS state. Compared with the antenna 14 in the electronic device 1 shown in FIG. 3*a*, the second radiator 142 is added to the antennas 14 in the electronic devices 1 shown in FIG. 6, FIG. 7, and FIG. 8, and the second radiator 142 is electrically connected to the first edge a of the middle plate 121. In the electronic device 1 shown in FIG. 6, the second radiator 142 of the antenna 14 is electrically connected to the middle section of the first edge a of the middle plate 121. In the electronic devices 1 shown in FIG. 7 and FIG. 8, the second radiator 142 of the antenna 14 is electrically connected to the end section in which the first end M of the first edge a of the middle plate 121 is located. In FIG. 10 to FIG. 12, an abscissa is a frequency (where a unit is GHz) and an ordinate is efficiency (where a unit is dB). It can be seen from FIG. 10 to FIG. 12 that radiation efficiency at which the antennas 14 in the electronic devices 1 shown in FIG. 6, FIG. 7, and FIG. 8 generate a common low band (low band, LB) antenna band (for example, a band of B28, B5, or B8) in an FS state is greater than radiation efficiency at which the antenna 14 in the electronic device 1 shown in FIG. 3*a* generates a common LB antenna band in an FS state; and radiation efficiency at which the antennas 14 in the electronic devices 1 shown in FIG. 7 and FIG. 8 generate a common LB antenna band in an FS state is greater than radiation efficiency at which the antenna 14 in the electronic device 1 shown in FIG. 6 generates a common LB antenna band in an FS state.

Figure 13:
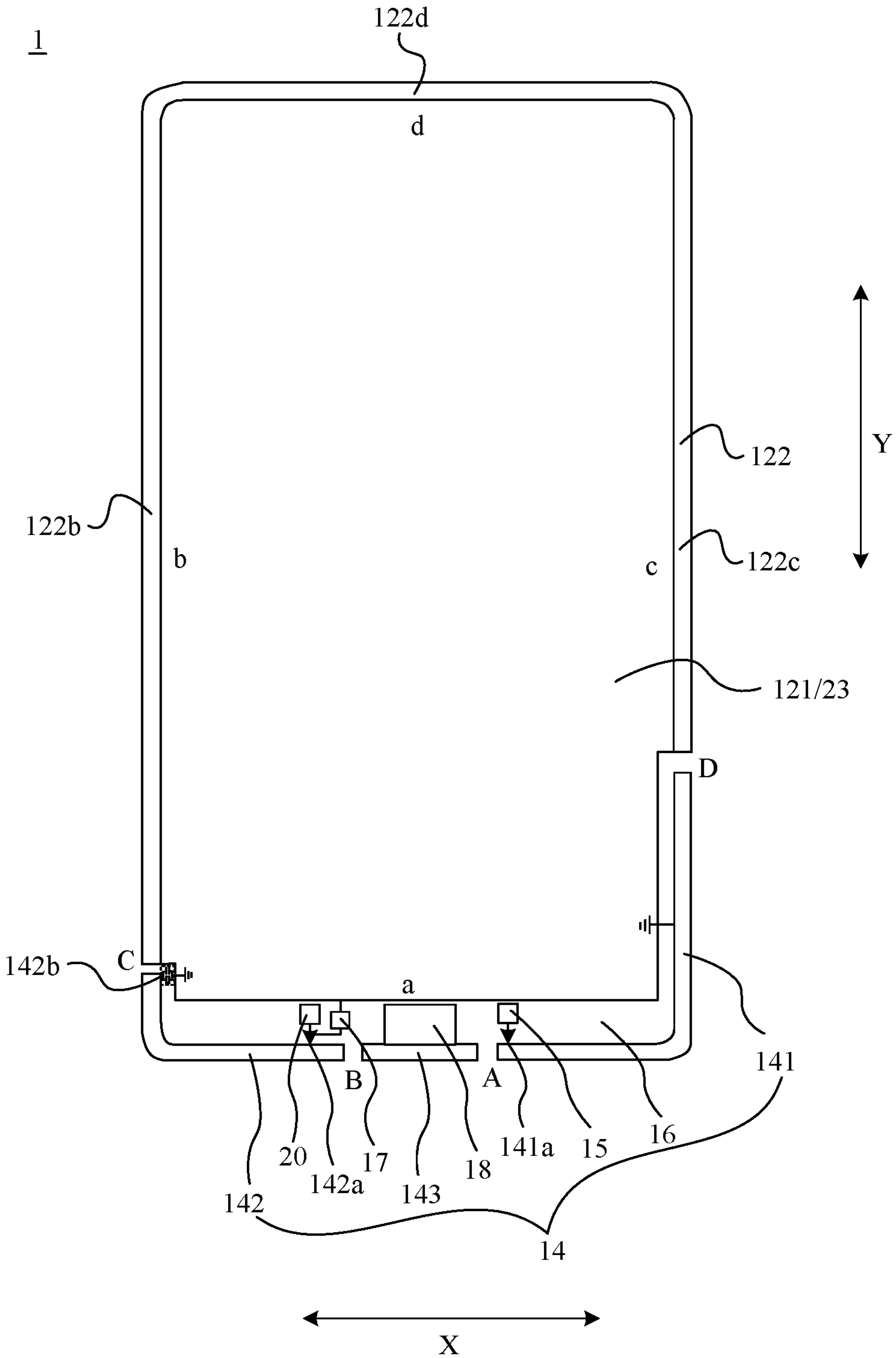
FIG. 13 is a schematic diagram of another internal structure of the electronic device shown in FIG. 1.

To increase an application band range of the antenna 14, in some embodiments, refer to FIG. 13. FIG. 13 is a schematic diagram of another internal structure of the electronic device 1 shown in FIG. 1. In this embodiment, the second radiator 142 has a second ground point 142*b* and a second feed point 142*a* that are disposed at an interval. Locations of disposing the second ground point 142*b* and the second feed point 142*a* on the second radiator 142 are not limited, provided that the second ground point 142*b* and the second feed point 142*a* are disposed at an interval along the second radiator 142. In some embodiments, the second ground point 142*b* and the second feed point 142*a* are respectively disposed at opposite ends of the second radiator 142 in an extension direction of the second radiator 142. For example, still as shown in FIG. 13, the second ground point 142*b* is disposed at an end that is of the second radiator 142 and that forms the third gap C, and the second feed point 142*a* is disposed at an end that is of the second radiator 142 and that forms the second gap B. It may be understood that the second ground point 142*b* may alternatively be disposed at an end that is of the second radiator 142 and that forms the second gap B, and in this case, the second feed point 142*a* is disposed at an end that is of the second radiator 142 and that forms the third gap C. In this way, the second radiator 142 forms a CRLH antenna or a loop (loop) antenna.

Figure 14:
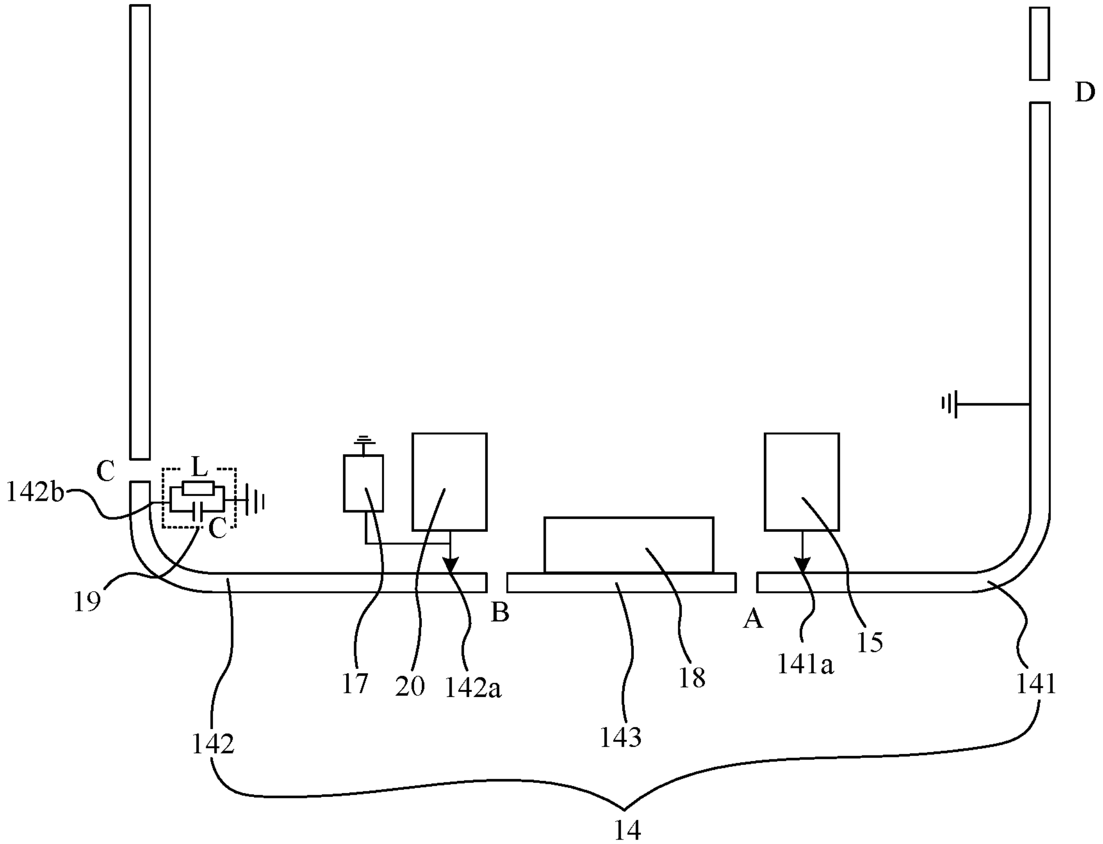
FIG. 14 is a diagram of an enlarged part of the electronic device shown in FIG. 13.

In some embodiments, FIG. 14 is a diagram of an enlarged part of the electronic device 1 shown in FIG. 13. The second ground point 142*b* is electrically connected to the reference ground layer 23 through a filter 19. In other words, the second ground point 142*b* is electrically connected to one end of the filter 19, and the other end of the filter 19 is electrically connected to the reference ground layer 23. In some embodiments, the filter 19 is an LC filter. Specifically, the filter 19 includes a capacitor C and an inductor L that are connected in parallel. The filter 19 is configured to prevent a signal within the first band from passing through and allow a signal within the second band to pass through. The first band includes a main resonant band generated by the first radiator 141 and a parasitic resonant band generated by the second radiator 142 when a radio frequency signal is fed at the first feed point 141*a*. For example, the first band includes a minimum frequency value within the parasitic resonant band generated by the second radiator 142 when the radio frequency signal is fed at the first feed point 141*a* to a maximum frequency value within the main resonant band generated by the first radiator 141 when the radio frequency signal is fed at the first feed point 141*a*. For example, the parasitic resonant band generated by the second radiator 142 when the radio frequency signal is fed at the first feed point 141*a* is 700 MHz to 750 MHz, the minimum frequency value within the band is 700 MHz, the main resonant band generated by the first radiator 141 when the radio frequency signal is fed at the first feed point 141*a* is 780 MHz to 850 MHz, and the maximum frequency value within the band is 850 MHz. In this case, the first band includes 700 MHz to 850 MHz. The second band includes a main resonant band generated by the second radiator 142 when a radio frequency signal is fed at the second feed point 142*a*. For example, the main resonant band generated by the second radiator 142 when the radio frequency signal is fed at the second feed point 142*a* is 1810 MHz to 2000 MHz, and in this case, the second band includes 1810 MHz to 2000 MHz.

The first band includes the main resonant band generated by the first radiator 141 and the parasitic resonant band generated by the second radiator 142 when the radio frequency signal is fed at the first feed point 141*a*. The second band includes the main resonant band generated by the second radiator 142 when the radio frequency signal is fed at the second feed point 142*a* of the second radiator 142.

Figure 15:
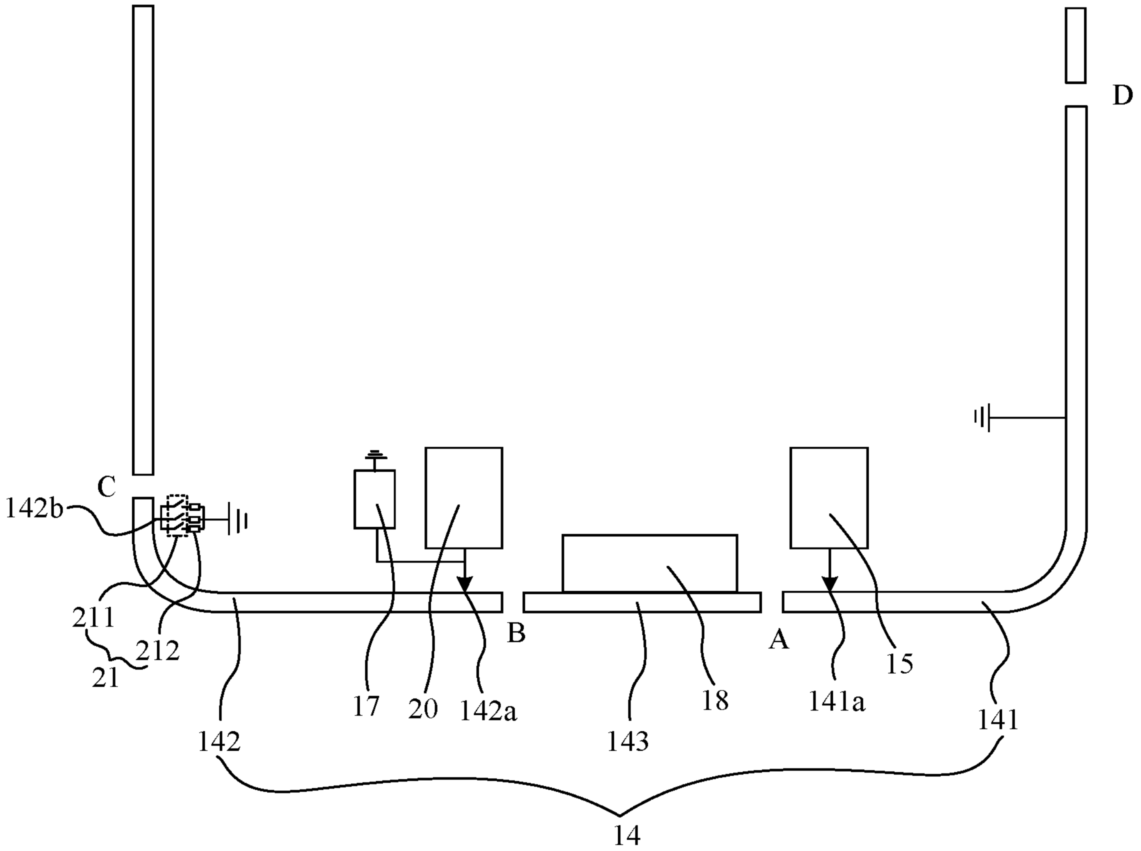
FIG. 15 is a diagram of another enlarged part of the electronic device shown in FIG. 13.

In some other embodiments, FIG. 15 is a diagram of another enlarged part of the electronic device 1 shown in FIG. 13. The second ground point 142*b* is electrically connected to the reference ground layer 23 through a switch circuit 21. In other words, the second ground point 142*b* is electrically connected to one end of the switch circuit 21, and the other end of the switch circuit 21 is electrically connected to the reference ground layer 23. The switch circuit 21 may be switched to an off state when the radio frequency signal within the first band is fed at the first feed point 141*a*, or may be in an on state when the radio frequency signal within the second band is fed at the second feed point 142*a*, to prevent the signal within the first band from passing through and allow the signal within the second band to pass through. In some embodiments, the switch circuit 21 includes one active switch and tuning elements connected between the active switch and the second ground point 142*b* and/or between the active switch and the reference ground layer 23. The tuning element is an inductor, a capacitor, or a circuit obtained by connecting one or two of an inductor or a capacitor in parallel, in series, or in series-parallel. In some other embodiments, as shown in FIG. 15, the switch circuit 21 includes a first switching switch 211 and a plurality of different first tuning elements 212. The first tuning element 212 includes but is not limited to a capacitor, an inductor, or a circuit obtained by connecting one or two of an inductor or a capacitor in parallel, in series, or in series-parallel. The plurality of first tuning elements 212 are electrically connected to the reference ground layer 23. The first switching switch 211 includes but is not limited to a single-pole multi-throw switch or a multi-pole multi-throw switch. The first switching switch 211 is configured to: when the radio frequency signal within the first band is fed at the first feed point 141*a*, disconnect an electrical connection path between the second ground point 142*b* and the plurality of first tuning elements 212; or when the radio frequency signal within the second band is fed at the second feed point, electrically connect the different first tuning elements to the second ground point in a switchable manner, to adjust the resonant band generated by the second radiator 142. In this way, the switch circuit 21 can prevent the signal within the first band from passing through and allow the signal within the second band to pass through. The switch circuit 21 may further adjust an operating band of the second radiator 142.

It should be noted that the second ground point 142*b* in this application is not an actual point, and a location at which the reference ground layer 23 is electrically connected to the second radiator 142 through the filter 19 or the switch circuit 21 is the second ground point 142*b*.

The electronic device 1 further includes a second radio frequency front end 20. The second radio frequency front end 20 is electrically connected to the second feed point 142*a* of the second radiator 142, and the second radio frequency front end 20 is configured to feed a radio frequency signal to the second radiator 142 or receive a radio frequency signal received by the second radiator 142 from the outside. In some embodiments, the second radio frequency front end 20 includes a transmit channel and a receive channel. The transmit channel includes components such as a power amplifier and a filter. The components such as the power amplifier and the filter perform processing such as power amplification and filtering on a signal, transmit a processed signal to the second radiator 142, and transmit the processed signal to the outside through the second radiator 142. The receive channel includes components such as a low noise amplifier and a filter. The components such as the low noise amplifier and the filter perform processing such as low noise amplification and filtering on a signal received by the second radiator 142 from the outside, and then transmit a processed signal to a radio frequency chip, to implement communication between the electronic device 1 and the outside through the second radio frequency front end 20 and the antenna 14. It should be noted that the second feed point 142*a* in this application is not an actual point, and a location at which the second radio frequency front end 20 is electrically connected to the second radiator 142 is the second feed point 142*a* in this application. In some embodiments, the second radio frequency front end 20 is disposed between the middle plate 121 of the middle frame 12 and the back cover 13. In some embodiments, a frequency of the radio frequency signal fed by the second radio frequency front end 20 falls within the main resonant band of the second radiator 142.

In this way, the antenna 1 provided in this embodiment can transmit or receive the signal within the first band when the radio frequency signal is fed at the first feed point 141*a*, and can further transmit or receive the signal within the second band when the radio frequency signal is fed at the second feed point 142*a*. Therefore, the antenna 14 has more application bands and a wide application range.

In some embodiments, the electronic device 1 is a mobile phone. A length of the middle plate 121 in a longitudinal direction is 150 mm±10 mm, and a width of the middle plate 121 in a transverse direction is 75 mm±5 mm. The first direction is consistent with the longitudinal direction of the middle plate 121, and a shorter edge of the middle plate 121 forms the first edge of the reference ground layer 23. The first band falls within a low band (low band, LB), and the second band falls within a medium/high band (middle/high band, MI-IB). The LB band may be, for example, 699 MHz to 960 MHz. The MHB band may be, for example, 1710 MHz to 2690 MHz. In this way, the antenna 14 provided in this embodiment of this application can cover a low/middle/high band (low/middle/high band, LMH), and has a wide application range.

In some other embodiments, the electronic device 1 is a mobile phone. A length of the middle plate 121 in a longitudinal direction is 150 mm±10 mm, and a width of the middle plate 121 in a transverse direction is 75 mm±5 mm. The first direction is consistent with the transverse direction of the middle plate 121, and a longer edge of the middle plate 121 forms the first edge of the reference ground layer 23. The first band falls within a medium/high band (middle/high band, MHB), and the second band falls within an LB band.

In the embodiments shown in FIG. 13 to FIG. 15, when the radio frequency signal is fed at the first feed point 141*a*, the switch circuit 21 or the filter 19 is in a blocked state, the second ground point 142*b* of the second radiator 142 is not connected to the reference ground layer 23, and the second radiator 142 is connected to the first edge a of the reference ground layer 23 only through the lumped parameter element 17. In this case, the lumped parameter element 17 is configured to adjust the electrical length of the second radiator 142, so that the second radiator 142 excites a first direction mode (for example, longitudinal mode) of the reference ground layer 23. When the radio frequency signal is fed at the second feed point 142*a*, the switch circuit 21 or the filter 19 is in an on state, the second ground point 142*b* of the second radiator 142 is connected to the reference ground layer 23, and the second radiator 142 is further connected to the first edge a of the reference ground layer 23 only through the lumped parameter element 17. In this case, the lumped parameter element 17 forms a tuning element of the second radiator 142, and the tuning element is configured to adjust an operating band of the second radiator 142.

An end that is of the lumped parameter element 17 and that is connected to the second radiator 142 may be connected to an end part of the second radiator 142 in the extension direction of the second radiator 142, or may be connected to a middle part of the second radiator 142 in the extension direction of the second radiator 142. This is not specifically limited herein. In some embodiments, still as shown in FIG. 13 to FIG. 15, both the lumped parameter element 17 and the second radio frequency front end 20 are connected to the second feed point 142*a* of the second radiator 142. In this case, the lumped parameter element 17 is electrically connected to the end part of the second radiator 142, and the lumped parameter element 17 and the second radio frequency front end 20 share a location on the second radiator 142. Therefore, a quantity of electrical connection points of the second radiator 142 can be reduced, and structural complexity is low.

Figure 16:
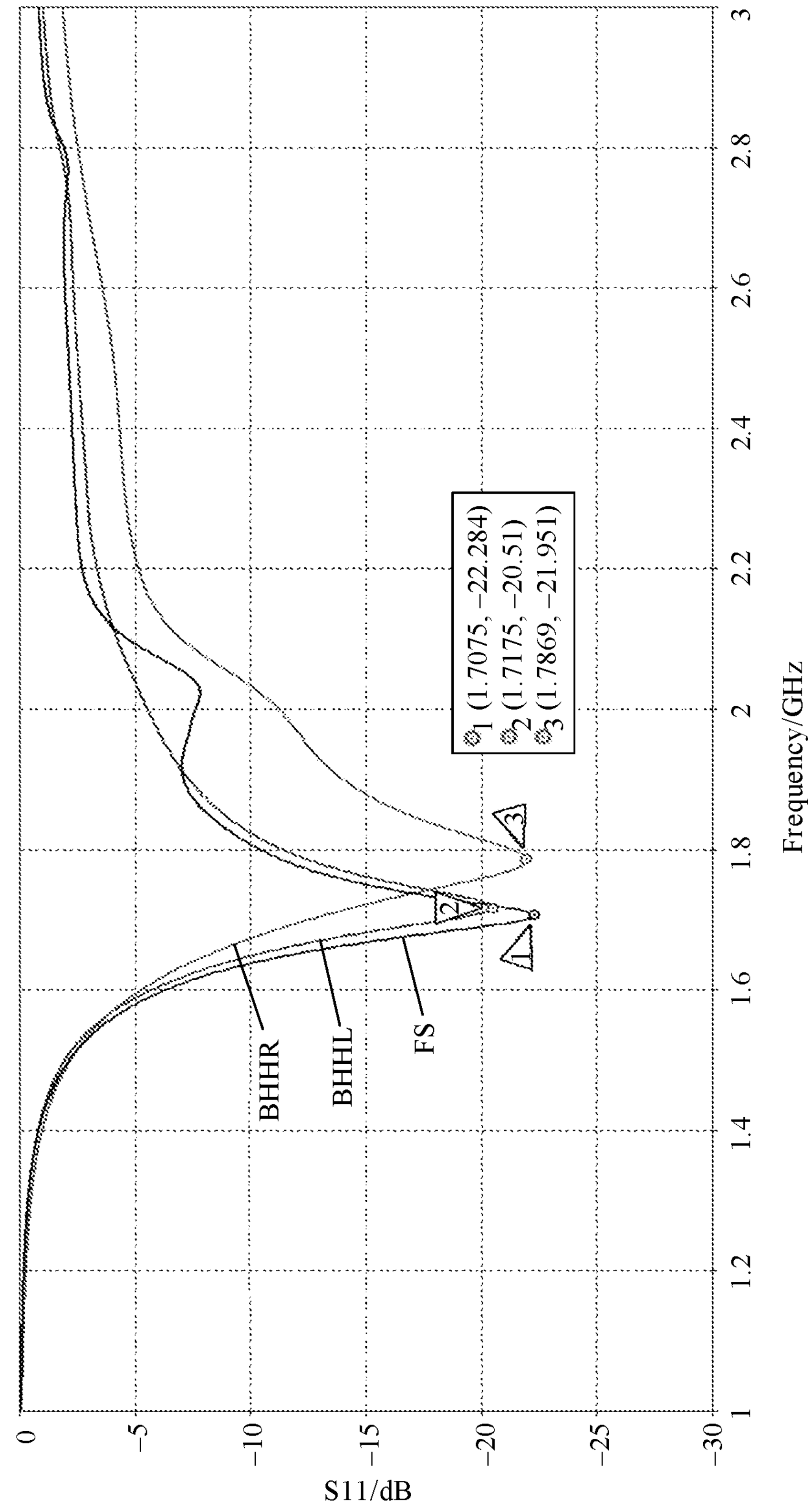
FIG. 16 is a curve diagram of medium/high band input return loss coefficients of an antenna in the electronic device shown in FIG. 13 in an FS state, a beside head hand left (beside head hand left, BHHL) state, and a beside head hand right (beside head hand right, BHHR) state.

In the embodiment shown in FIG. 13, the third gap C is disposed on the second side 122*b* of the frame 122. When the electronic device 1 is held by a hand, the third gap C is easily blocked. As a result, medium/high band (MHB) radiation performance of the antenna 14 obtained when the radio frequency signal is fed at the second feed point 142*a* is weakened, and a resonant frequency shift occurs. FIG. 16 is a curve diagram of medium/high band input return loss coefficients (S11) (in other words, input return loss coefficients at the second feed point 142*a*) of the antenna 14 in the electronic device 1 shown in FIG. 13 in an FS state, a beside head hand left (BHHL) state, and a beside head hand right (BHHR) state.

Figure 17:
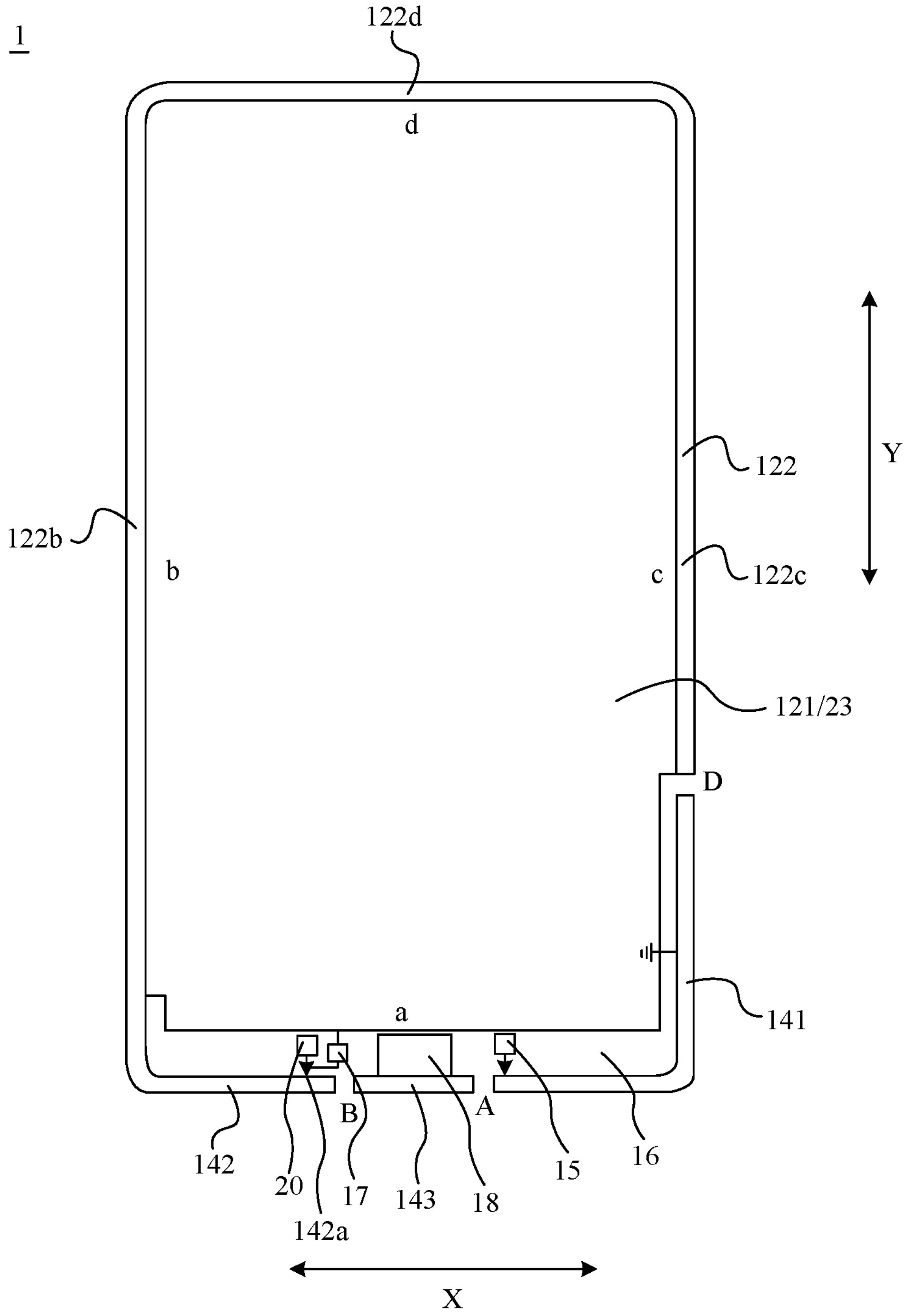
FIG. 17 is a schematic diagram of another internal structure of the electronic device 1 shown in FIG. 1.
Figure 18:
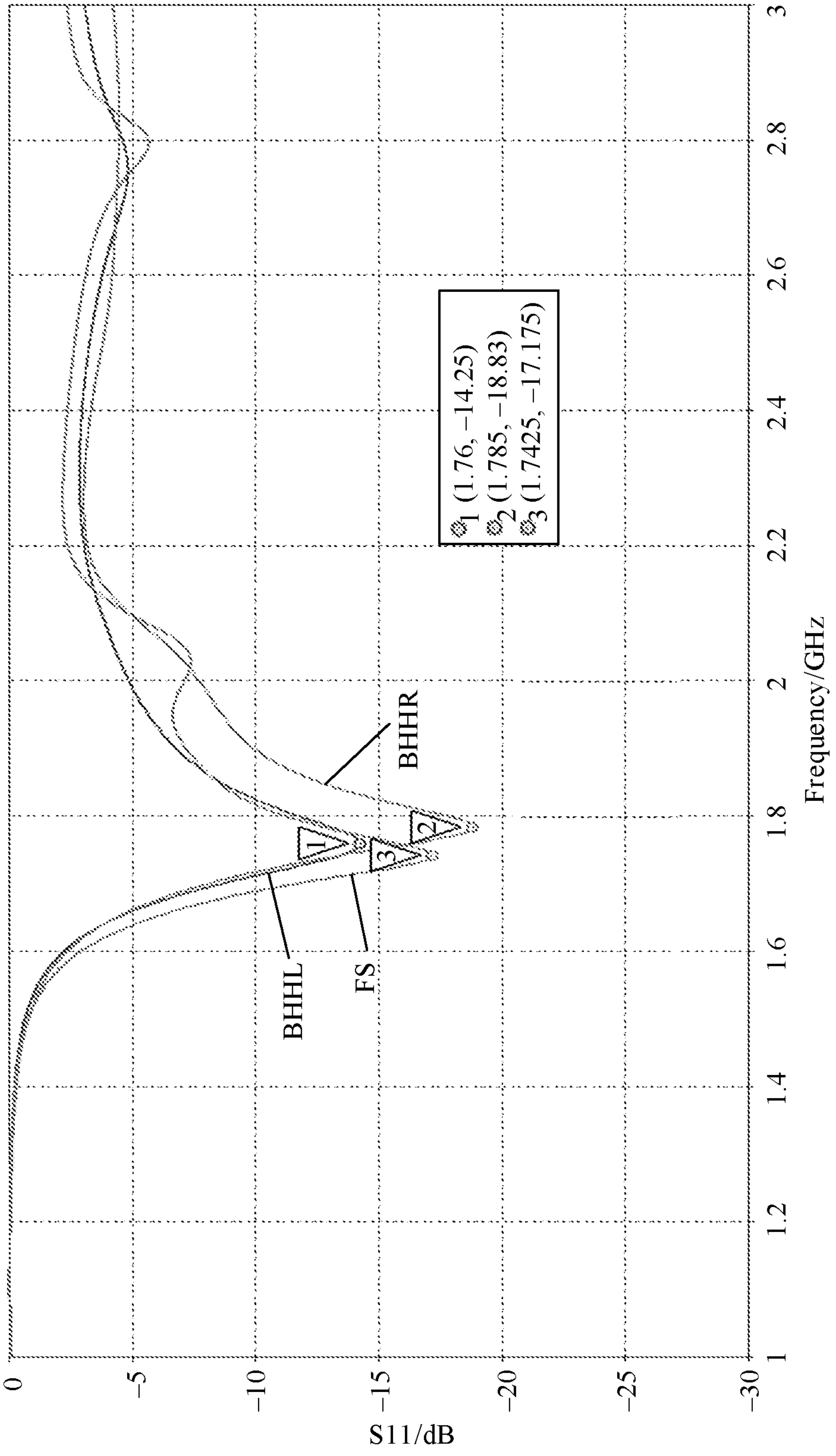
FIG. 18 is a curve diagram of medium/high band input return loss coefficients of an antenna in the electronic device shown in FIG. 17 in an FS state, a BHHL state, and a BHHR state.
Figure 19:
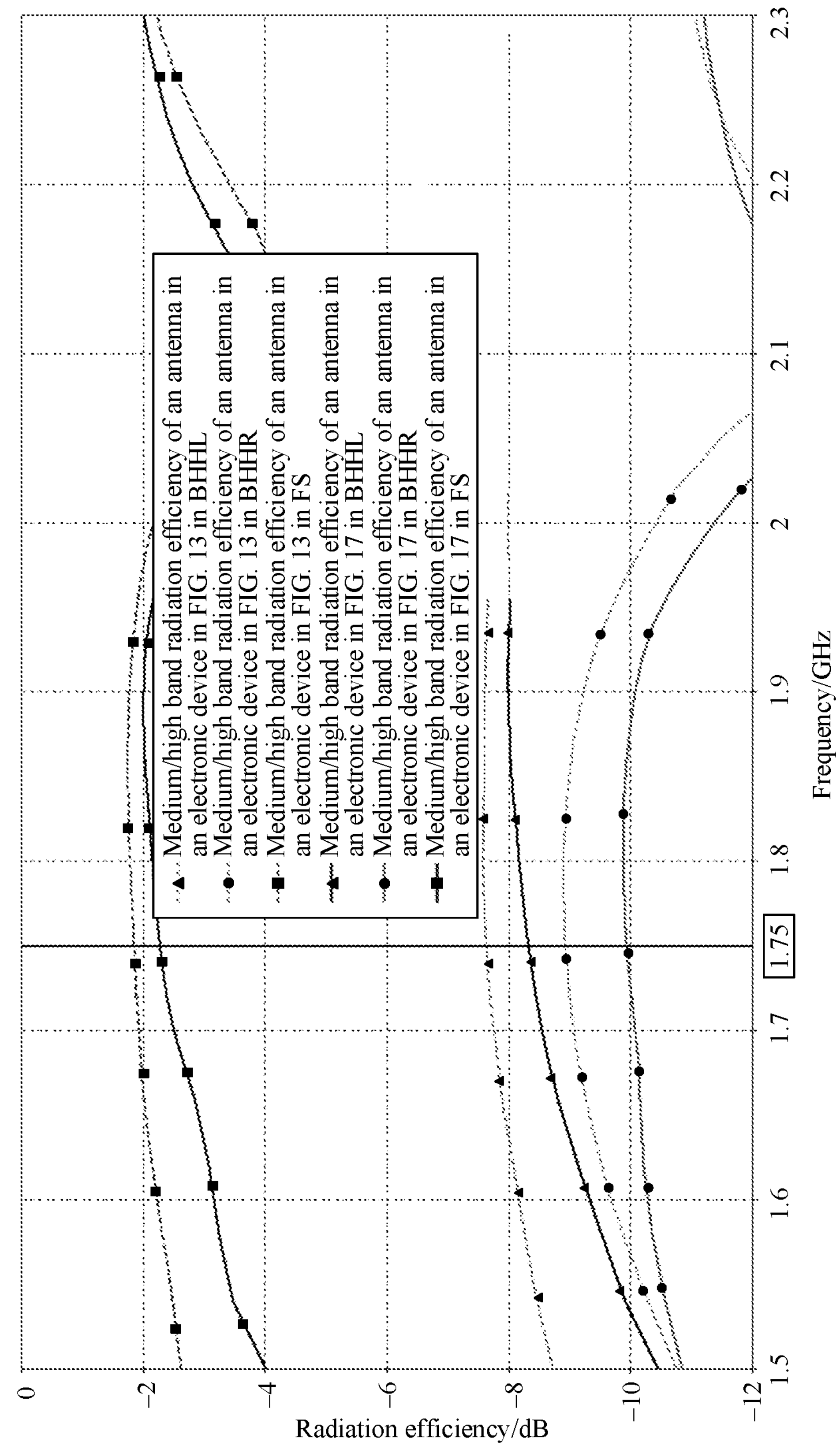
FIG. 19 is a curve comparison diagram of medium/high band radiation efficiency of antennas in the electronic devices shown in FIG. 13 and FIG. 17 in an FS state, a BHHL state, and a BHHR state.

However, when the electronic device 1 shown in FIG. 13 does not include the third gap C, the filter 19, and the switch circuit 21, a schematic diagram of another internal structure of the electronic device 1 shown in FIG. 17 is obtained. FIG. 18 is a curve diagram of medium/high band input return loss coefficients (S11) of the antenna 14 in the electronic device 1 shown in FIG. 17 in an FS state, a BHHL state, and a BHHR state. In FIG. 16 and FIG. 18, an abscissa is a frequency (where a unit is GHz) and an ordinate is S11 (where a unit is dB). It can be learned, by comparing FIG. 16 with FIG. 18, that the antenna 14 in the electronic device 1 shown in FIG. 13 generates a smaller medium/high band resonant frequency offset in the FS state, the BHHL state, and the BHHR state. In addition, when the electronic device 1 is held by the hand, impact on the medium/high band radiation performance of the antenna 14 is small. FIG. 19 is a curve comparison diagram of medium/high band radiation efficiency of the antennas 14 in the electronic devices shown in FIG. 13 and FIG. 17 in an FS state, a BHHL state, and a BHHR state. In FIG. 19, an abscissa is a frequency (where a unit is GHz) and an ordinate is radiation efficiency (where a unit is dB). It can be seen from FIG. 19 that the medium/high band radiation efficiency of the antenna 14 in the electronic device 1 shown in FIG. 13 in the FS state, the BHHL state, and the BREW state respectively is greater than the medium/high band radiation efficiency of the antenna 14 in the electronic device 1 shown in FIG. 17 in the FS state, the BHHL state, and the BHHR state. Therefore, the antenna 14 in the electronic device 1 shown in FIG. 13 may be put into practical application, and the medium/high band radiation performance is good.

Figure 20:
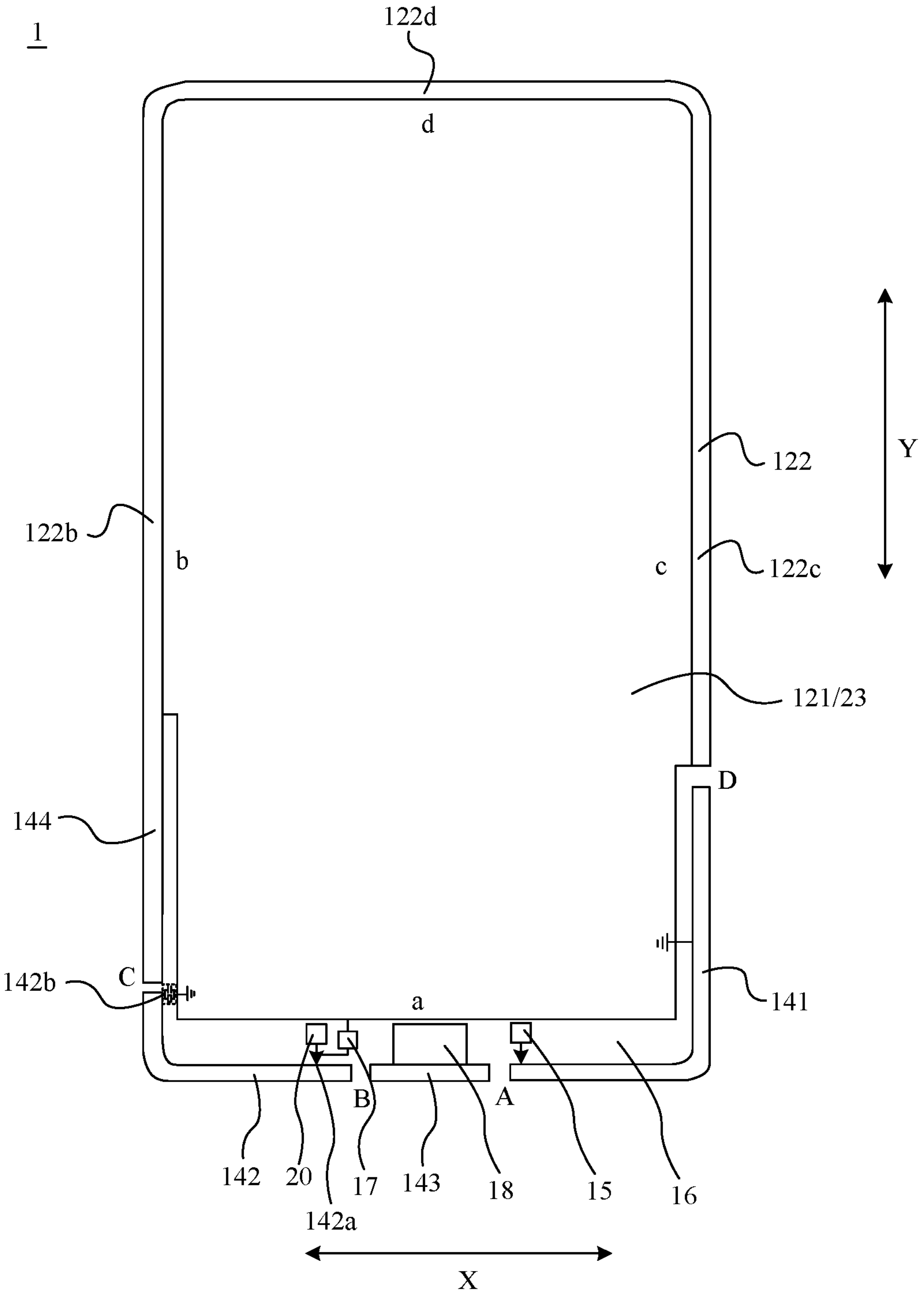
FIG. 20 is a schematic diagram of another internal structure of the electronic device shown in FIG. 1.

To further increase a quantity of radiation bands of the antenna 14, in some embodiments, refer to FIG. 20. FIG. 20 is a schematic diagram of another internal structure of the electronic device 1 shown in FIG. 1. In this embodiment, a part of the frame 122 that is located on a side of the third gap C and that is away from the second gap B and adjacent to the third gap C forms a third radiator 144, in other words, the third radiator 144 and the second radiator 142 are respectively located on two sides of the third gap C. There is a clearance 16 between the third radiator 144 and the middle plate 121. For example, the second radiator 142 is formed on the frame 122 and located on one side of the third gap C, and the third radiator 144 is formed on the frame 122 and located on the other side of the third gap C. The third radiator 144 may be coupled to the second radiator 142 to generate parasitic resonance when a radio frequency signal is fed at the second feed point 142*a*, so that a quantity of radiation bands of the antenna 14 can be further increased.

Figure 21:
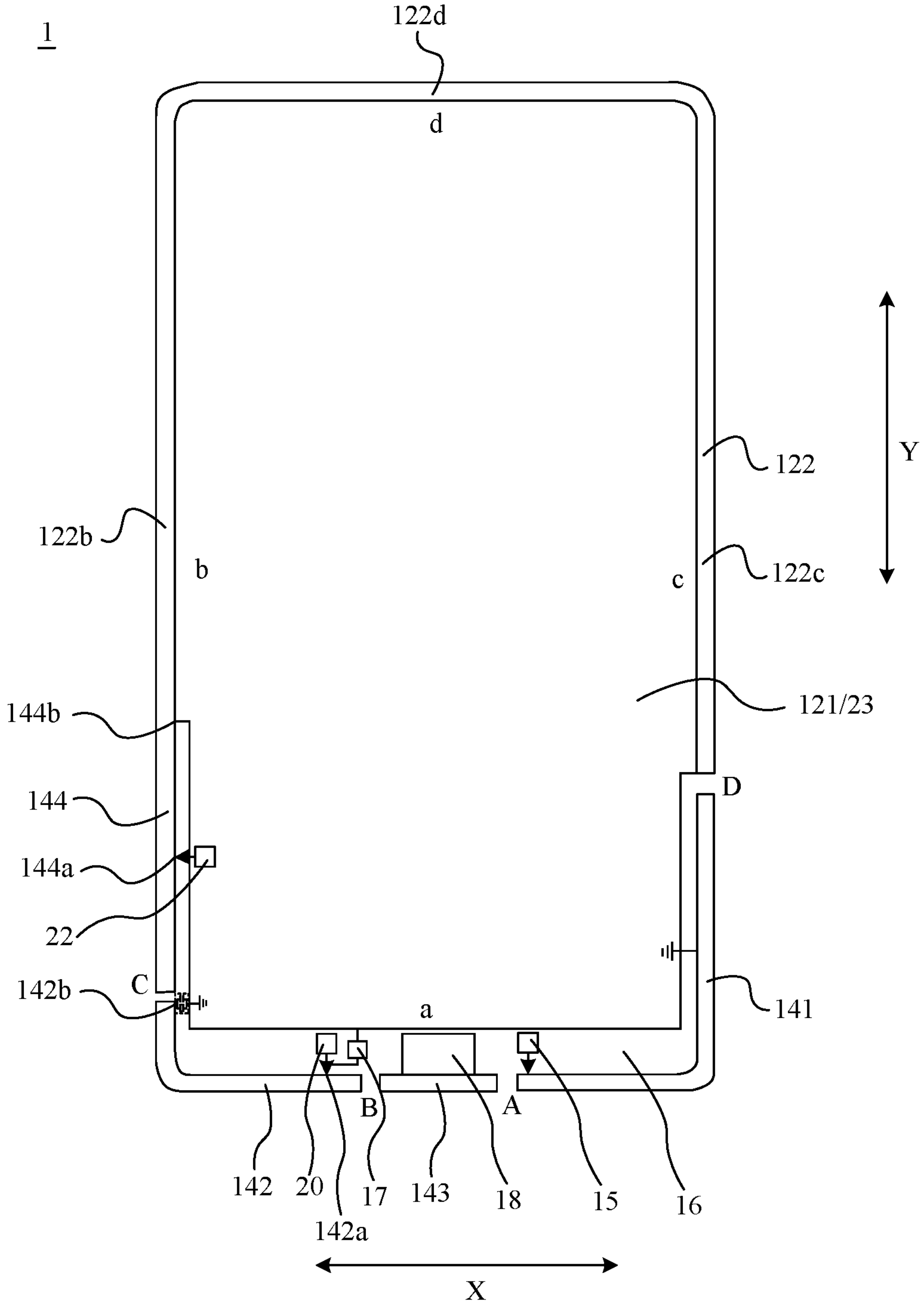
FIG. 21 is a schematic diagram of another internal structure of the electronic device shown in FIG. 1.

In some embodiments, FIG. 21 is a schematic diagram of another internal structure of the electronic device 1 shown in FIG. 1. In this embodiment, the third radiator 144 has a third ground point 144*b* and a third feed point 144*a* that are disposed at an interval. The third ground point 144*b* is electrically connected to the reference ground layer 23. In some embodiments, as shown in FIG. 21, the third ground point 144*b* is connected to another part of the frame 122*b*, so that the third ground point 144*b* is electrically connected to the middle plate 121 (namely, the reference ground layer 23) through the another part of the frame 122, to implement grounding. The electronic device 1 further includes a third radio frequency front end 22. The third radio frequency front end 22 is electrically connected to the third feed point 144*a*.

Figure 22:
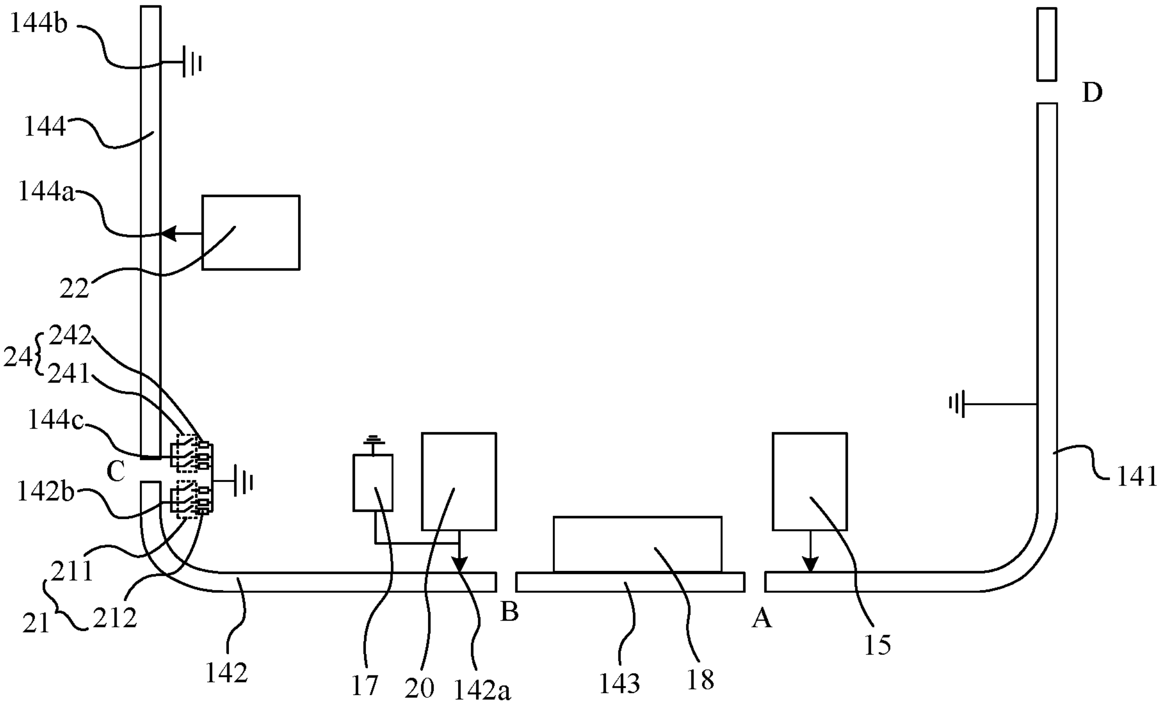
FIG. 22 is a schematic diagram of another internal structure of the electronic device shown in FIG. 1.

In some embodiments, FIG. 22 is a schematic diagram of another internal structure of the electronic device 1 shown in FIG. 1. In this embodiment, the third radiator 144 has a connection point 144*c*. In some embodiments, the connection point 144*c* and the third ground point 144*b* are respectively located on two sides of the third feed point 144*a*. Specifically, the connection point 144*c* is located at an end that is of the third radiator 144 and that is adjacent to the third gap C. The connection point 144*c* is electrically connected to the reference ground layer 23 through a switching circuit 24. The switching circuit 24 includes a second switching switch 241 and a plurality of different second tuning elements 242. The second tuning element 242 includes but is not limited to a capacitor, an inductor, or a circuit obtained by connecting one or two of an inductor or a capacitor in parallel, in series, or in series-parallel. The plurality of second tuning elements 242 are electrically connected to the reference ground layer 23. The second switching switch 241 includes but is not limited to a single-pole multi-throw switch or a multi-pole multi-throw switch. The second switching switch 241 is configured to electrically connect the different second tuning elements 242 to the connection point 144*c* in a switchable manner, to adjust a resonant frequency of the third radiator 144. Specifically, the switching circuit 24 is configured to tune a resonant frequency of a part that is of the third radiator 144 and that is located between the third ground point 144*b* and the third gap C. It should be noted that the connection point 144*c* in this application is not an actual point, and a location at which the switching circuit 24 is electrically connected to the third radiator 144 is the connection point 144*c*.

Based on the foregoing embodiment, optionally, when the second radiator 143 is grounded through the switch circuit 21, the first switching switch 211 in the switch circuit 21 and the second switching switch 241 in the switching circuit 24 are packaged together, and an entire switch line of a switch formed through package is a superposition of a switch line of the first switching switch 211 and a switch line of the second switching switch 241. Therefore, a quantity of components included in the electronic device can be reduced, and an assembly process of the electronic device can be simplified.

In the descriptions of this specification, the specific features, structures, materials, or characteristics may be combined in a proper manner in any one or more of the embodiments or examples.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. An electronic device, comprising: a reference ground layer, wherein the reference ground layer has a first edge, and a second edge and a third edge that are respectively connected to two ends of the first edge; a first radiator, wherein the first radiator has a first ground point and a first feed point that are disposed at an interval, the first ground point is electrically connected to the reference ground layer, and the first feed point is configured to feed the first radiator;

and a second radiator, wherein the second radiator and the first radiator are disposed at an interval, the second radiator is electrically connected to one of the first edge of the reference ground layer, or an end section that is of the second edge and that is connected to the first edge, or an end section that is of the third edge and that is connected to the first edge, an electrical length of the reference ground layer in a first direction is a ½ wavelength of a main resonant band of the first radiator, the first direction is parallel to a plane on which the reference ground layer is located and perpendicular to an extension direction of the first edge of the reference ground layer, and a parasitic resonant band generated by the second radiator when a radio frequency signal is fed at the first feed point is lower than a main resonant band generated by the first radiator when the radio frequency signal is fed at the first feed point.

2. The electronic device according to claim 1, wherein the second radiator is electrically connected to an end section of the first edge of the reference ground layer.

3. The electronic device according to claim 1, wherein the second radiator is electrically connected to one of the first edge of the reference ground layer, the end section of the second edge and that is connected to the first edge, or the end section of the third edge and that is connected to the first edge through a lumped parameter element.

4. The electronic device according to claim 3, wherein the lumped parameter element is one of an inductor, a capacitor, or a circuit obtained by connecting one or two of an inductor or a capacitor in parallel, in series, or in series-parallel.

5. The electronic device according to claim 1, wherein the second radiator has a second feed point and a second ground point that are disposed at an interval, the second feed point is configured to feed the second radiator, the second ground point is electrically connected to the reference ground layer through one of a filter or a switch circuit, and the filter and the switch circuit are configured to prevent a signal within a first band from passing through and allow a signal within a second band to pass through, wherein the first band comprises a minimum frequency value within the parasitic resonant band generated by the second radiator when the radio frequency signal is fed at the first feed point to a maximum frequency value within the main resonant band generated by the first radiator when the radio frequency signal is fed at the first feed point, and the second band comprises a main resonant band generated by the second radiator when a radio frequency signal is fed at the second feed point.

6. The electronic device according to claim 5, wherein the filter is an LC filter.

7. The electronic device according to claim 5, wherein the switch circuit comprises a first switching switch and a plurality of different first tuning elements, and the plurality of first tuning elements are electrically connected to the reference ground layer; and the first switching switch is configured to perform one of: when the radio frequency signal within the first band is fed at the first feed point, disconnect an electrical connection path between the second ground point and the plurality of first tuning elements; or when the radio frequency signal within the second band is fed at the second feed point, electrically connect the different first tuning elements to the second ground point in a switchable manner, to adjust the resonant band generated by the second radiator.

8. The electronic device according to claim 5, wherein one of the first band and the second band falls within a low band, and the other of the first band and the second band falls within a medium/high band.

9. The electronic device according to claim 1, further comprising:

a conductive middle plate, wherein the middle plate forms the reference ground layer, a first edge of the middle plate forms the first edge of the reference ground layer, a second edge of the middle plate forms the second edge of the reference ground layer, a third edge of the middle plate forms the third edge of the reference ground layer, and two ends of the first edge of the middle plate are respectively connected to the second edge of the middle plate and the third edge of the middle plate; and a conductive frame, wherein the frame is disposed around the edges of the middle plate, the frame comprises a first side, and the first side is disposed around the first edge of the middle plate; the frame has at least a first gap, a second gap, and a third gap, the first gap and the second gap are located on the first side, and a part that is of the frame and that is located on one side of the first gap and adjacent to the first gap forms the first radiator; the third gap and the first radiator are respectively located on two sides of the first gap, the second gap and the first gap are a same gap, or the second gap is located between the third gap and the first gap, and a part that is of the frame and that is located between the second gap and the third gap forms the second radiator; and there are clearances between the first radiator and the middle plate, and between the second radiator and the middle plate.

10. The electronic device according to claim 9, wherein the second gap is located between the third gap and the first gap, a part that is of the frame and that is located between the first gap and the second gap forms a floating conductor, and the electronic device further comprises:

a USB device, wherein the USB device is located on an inner side of the floating conductor and is attached to the floating conductor.

11. The electronic device according to claim 9, wherein the first gap and the second gap are symmetrically disposed with respect to a center point of the first side.

12. The electronic device according to claim 9, wherein the first edge of the middle plate has a first end; and a distance between the first end and the first gap in an extension direction of the first side is greater than a distance between the first end and the second gap in the extension direction of the first side, and the second radiator is electrically connected to an end section in which the first end is located.

13. The electronic device according to claim 12, wherein the first end is connected to the second edge of the middle plate; and the frame further has a second side, the second side is disposed around the second edge of the middle plate, and the third gap is disposed on the second side.

14. The electronic device according to claim 13, wherein the second radiator comprises a first section and a second section that intersect, the first section is located between the second gap and the second section, the second section is located between the first section and the third gap, and a length of the second section is less than or equal to ¼ times a length of the second side.

15. The electronic device according to claim 12, wherein the first edge of the middle plate further has a second end opposite to the first end, and the second end is connected to the third edge of the middle plate; and the frame further has a third side, the third side is disposed around the third edge of the middle plate, the frame further has a fourth gap, the fourth gap is disposed on the third side, and a part that is of the frame and that is between the first gap and the fourth gap forms the first radiator.

16. The electronic device according to claim 15, wherein the first radiator comprises a third section and a fourth section that intersect, the third section is located between the first gap and the fourth section, the fourth section is located between the third section and the fourth gap, and a length of the fourth section is less than or equal to ½ times a length of the third side.

17. The electronic device according to claim 9, wherein a part that is of the frame and that is adjacent to the third gap forms a third radiator, the third radiator and the second radiator are respectively located on two sides of the third gap, and there is a clearance between the third radiator and the middle plate; and the third radiator has a third ground point and a third feed point that are disposed at an interval, the third ground point is electrically connected to the reference ground layer, and the third feed point is configured to feed the third radiator.

18. The electronic device according to claim 17, wherein the third radiator further has a connection point, the electronic device further comprises a switching circuit, the switching circuit comprises a second switching switch and a plurality of different second tuning elements, and the plurality of second tuning elements are electrically connected to the reference ground layer; and the second switching switch is configured to electrically connect the different second tuning elements to the connection point in a switchable manner, to adjust a resonant frequency of the third radiator.

* * * * *